US012591065B2

(12) United States Patent
Kato et al.

(10) Patent No.: US 12,591,065 B2
(45) Date of Patent: Mar. 31, 2026

(54) DISTANCE MEASUREMENT DEVICE AND DISTANCE MEASUREMENT SYSTEM

(71) Applicant: Panasonic Intellectual Property Management Co., Ltd., Osaka (JP)

(72) Inventors: Yumiko Kato, Osaka (JP); Kenji Narumi, Osaka (JP); Yasuhisa Inada, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 728 days.

(21) Appl. No.: 18/057,757

(22) Filed: Nov. 21, 2022

(65) Prior Publication Data

US 2023/0078063 A1     Mar. 16, 2023

Related U.S. Application Data

(63) Continuation of application No. PCT/JP2021/020537, filed on May 28, 2021.

(30) Foreign Application Priority Data

Jun. 19, 2020     (JP) ................................. 2020-106358

(51) Int. Cl.
   *G01S 17/931*          (2020.01)
   *G01S 7/481*           (2006.01)
           (Continued)

(52) U.S. Cl.
   CPC ............ *G01S 17/931* (2020.01); *G01S 17/89* (2013.01); *G06T 7/521* (2017.01); *G01S 7/4817* (2013.01); *G06T 2207/30252* (2013.01)

(58) Field of Classification Search
   CPC ...... G01S 17/931; G01S 17/89; G01S 7/4817; G01S 7/4802; G01S 7/4808; G01S 17/87;
           (Continued)

(56) References Cited

U.S. PATENT DOCUMENTS

2010/0021011 A1     1/2010  Shida
2016/0047895 A1     2/2016  Dussan
                (Continued)

FOREIGN PATENT DOCUMENTS

JP       2009-040351       2/2009
JP       2009-217680       9/2009
                (Continued)

OTHER PUBLICATIONS

International Search Report of PCT application No. PCT/JP2021/020537 dated Aug. 10, 2021.
                (Continued)

*Primary Examiner* — Francis Geroleo
(74) *Attorney, Agent, or Firm* — Rimon P.C.

(57)                ABSTRACT

A distance measurement device is used in a system including two or more distance measurement devices having distance measurement ranges that are adjacent to each other or partially overlap each other. The distance measurement device includes: a light emission device; a light reception device which detect reflected light and to output a detection signal; and a processing circuit which determine the position of the target object. The processing circuit generates, based on the determined position of the target object, setting data defining an irradiation range of light to be emitted from the other distance measurement device and transmits the setting data to the other distance measurement device, and controls light emission from the light emission device in accordance with setting data defining an irradiation range of light to be emitted from the light emission device, when having received the setting data from the other distance measurement device.

14 Claims, 13 Drawing Sheets

(51) Int. Cl.
    *G01S 17/89*     (2020.01)
    *G06T 7/521*     (2017.01)

(58) Field of Classification Search
    CPC ..................... G01S 7/484; G06T 7/521; G06T
                            2207/30252; G02B 26/10
    See application file for complete search history.

(56) References Cited

U.S. PATENT DOCUMENTS

| | | |
|---|---|---|
| 2018/0011196 A1 | 1/2018 | Pennecot et al. |
| 2018/0081037 A1* | 3/2018 | Medina ................... G01S 7/497 |
| 2018/0217258 A1 | 8/2018 | Hirasawa et al. |
| 2019/0001971 A1* | 1/2019 | Nguyen Van ......... B60W 10/04 |
| 2020/0079364 A1* | 3/2020 | Min ............... B60W 30/18163 |

FOREIGN PATENT DOCUMENTS

| | | |
|---|---|---|
| JP | 2015-078925 | 4/2015 |
| JP | 2018-049014 | 3/2018 |
| JP | 2018-124271 | 8/2018 |
| JP | 2019-020139 | 2/2019 |
| JP | 2019-078688 | 5/2019 |
| WO | 2018/044958 A1 | 3/2018 |

OTHER PUBLICATIONS

The EPC Office Action dated Sep. 15, 2023 for the related European Patent Application No. 21825896.0.

* cited by examiner (a) LIGHT PROJECTION (b) REFLECTED LIGHT (c) EXPOSURE DURATION 1

(d) EXPOSURE DURATION 2

LIGHT PROJECTION

REFLECTED LIGHT

EXPOSURE DURATION

ELECTRIC CHARGE OUTPUT

FIG. 6A

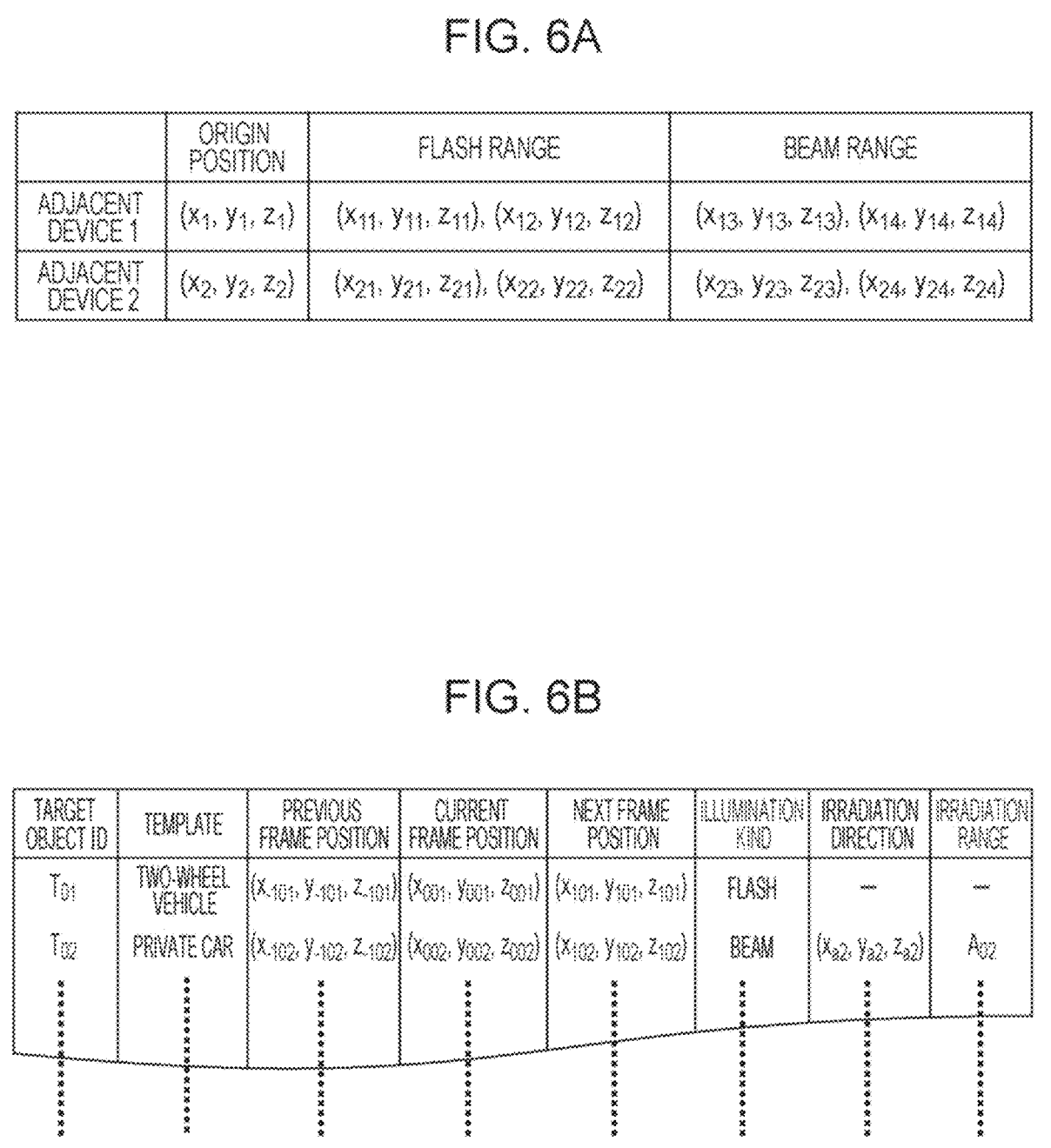

| | ORIGIN POSITION | FLASH RANGE | BEAM RANGE |
|---|---|---|---|
| ADJACENT DEVICE 1 | $(x_1, y_1, z_1)$ | $(x_{11}, y_{11}, z_{11}), (x_{12}, y_{12}, z_{12})$ | $(x_{13}, y_{13}, z_{13}), (x_{14}, y_{14}, z_{14})$ |
| ADJACENT DEVICE 2 | $(x_2, y_2, z_2)$ | $(x_{21}, y_{21}, z_{21}), (x_{22}, y_{22}, z_{22})$ | $(x_{23}, y_{23}, z_{23}), (x_{24}, y_{24}, z_{24})$ |

FIG. 6B

| TARGET OBJECT ID | TEMPLATE | PREVIOUS FRAME POSITION | CURRENT FRAME POSITION | NEXT FRAME POSITION | ILLUMINATION KIND | IRRADIATION DIRECTION | IRRADIATION RANGE |
|---|---|---|---|---|---|---|---|
| $T_{01}$ | TWO-WHEEL VEHICLE | $(x_{t01}, y_{t01}, z_{t01})$ | $(x_{001}, y_{001}, z_{001})$ | $(x_{101}, y_{101}, z_{101})$ | FLASH | — | — |
| $T_{02}$ | PRIVATE CAR | $(x_{t02}, y_{t02}, z_{t02})$ | $(x_{002}, y_{002}, z_{002})$ | $(x_{102}, y_{102}, z_{102})$ | BEAM | $(x_{a2}, y_{a2}, z_{a2})$ | $A_{02}$ |

|  | INSTALLATION POSITION | INSTALLATION ANGLE | CORRECTION VALUE |
|---|---|---|---|
| DISTANCE MEASUREMENT DEVICE 100a | $(x_{a1}, y_{a1}, z_{a1})$ | $(x_{a2}, y_{a2}, z_{a2})$ | $(x_{ac}, y_{ac}, z_{ac})$ |
| DISTANCE MEASUREMENT DEVICE 100b | $(x_{b1}, y_{b1}, z_{b1})$ | $(x_{b2}, y_{b2}, z_{b2})$ | $(x_{bc}, y_{bc}, z_{bc})$ |
| ⋮ | ⋮ | ⋮ | ⋮ |
| DISTANCE MEASUREMENT DEVICE 100n | $(x_{n1}, y_{n1}, z_{n1})$ | $(x_{n2}, y_{n2}, z_{n2})$ | $(x_{nc}, y_{nc}, z_{nc})$ |

DISTANCE MEASUREMENT DEVICE AND DISTANCE MEASUREMENT SYSTEM

BACKGROUND

1. Technical Field

The present disclosure relates to a distance measurement device and a distance measurement system.

2. Description of the Related Art

For an automated driving vehicle and a self-propelled system such as a self-propelled robot, it is important to avoid collision with another vehicle, a person, or the like. Thus, a system configured to perform external environment sensing with a camera or a distance measurement device is used.

As for distance measurement, various kinds of devices configured to measure the distance to one or more objects existing in a space have been disclosed. For example, Japanese Unexamined Patent Application Publication Nos. 2018-124271, 2009-217680, and 2018-049014 (referred to as PTL 1, PTL 2, and PTL 3, respectively) each disclose a system configured to measure the distance to an object by using time-of-flight (ToF) technologies.

PTL 1 discloses a system configured to measure the distance to an object by scanning a space with an optical beam and detecting reflected light from the object. The system sequentially causes one or more light receiving elements at an image sensor to detect the reflected light in each of a plurality of frame durations while changing the direction of the optical beam. With such operation, a time taken for acquisition of distance information of the entire target scene is reduced.

PTL 2 discloses a method of detecting a traversing object that moves in a direction different from the moving direction of the own-vehicle through a plurality of times of distance measurement in all directions. In the disclosure, for example, the signal-noise ratio is reduced by increasing the intensity or emission frequency of a light pulse from a light source.

PTL 3 discloses that a first distance measurement device and a second distance measurement device are separately provided to obtain detailed distance information of a distant target object, the second distance measurement device being configured to emit an optical beam to the distant target object.

SUMMARY

One non-limiting and exemplary embodiment provides a technology for efficient distance measurement of a movable object by using a plurality of distance measurement devices.

In one general aspect, the techniques disclosed here feature a distance measurement device in a system including two or more distance measurement devices having distance measurement ranges that are adjacent to each other or partially overlap each other, the distance measurement device including: a light emission device capable of changing an irradiation range of light; a light reception device configured to detect reflected light generated from the light emitted from the light emission device when reflected at a target object and to output a detection signal; and a processing circuit having a function to communicate with another distance measurement device in the system and configured to determine the position of the target object by calculating the distance to the target object based on the detection signal.

Here, the processing circuit generates, based on the determined position of the target object, first setting data defining an irradiation range of light to be emitted from the other distance measurement device and transmits the first setting data to the other distance measurement device, and controls light emission from the light emission device in accordance with second setting data defining an irradiation range of light to be emitted from the light emission device, when having received the second setting data from the other distance measurement device.

A comprehensive or specific aspect of the present disclosure may be achieved by a system, a device, a method, an integrated circuit, a computer program, or a computer-readable recording medium such as a recording disk or may be achieved by an optional combination of a system, a device, a method, an integrated circuit, a computer program, and a recording medium. A computer-readable recording medium may include a non-transitory recording medium such as a compact disc read only memory (CD-ROM). A device may be constituted by one or more devices. When a device is constituted by two or more devices, the two or more devices may be disposed in one instrument or may be separately disposed in two or more separated instruments. In the present specification and the claims, a "device" not only means one device but also means a system constituted by a plurality of devices.

According to an aspect of the present disclosure, it is possible to more efficiently acquire distance information of a movable object by using a plurality of distance measurement devices.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 6A is a diagram illustrating exemplary data stored in a storage medium;

FIG. 6B is a diagram illustrating exemplary data recorded in the storage medium in the course of processing;

DETAILED DESCRIPTIONS

Figure 1:
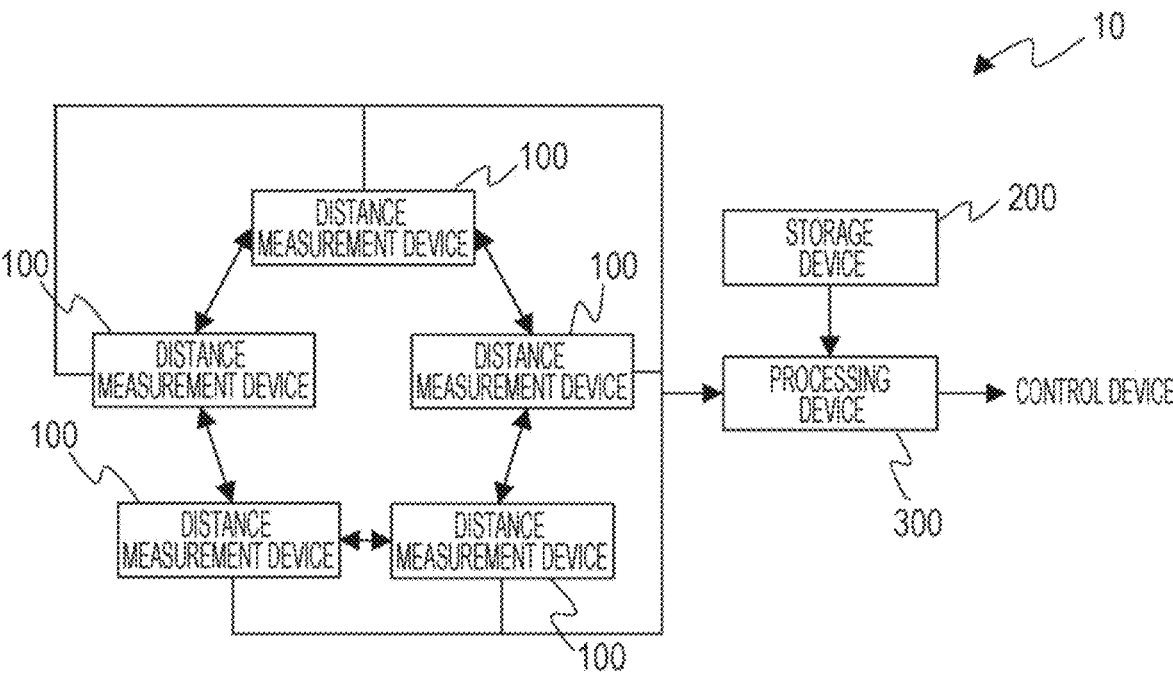
FIG. 1 is a block diagram schematically illustrating a schematic configuration of a distance measurement system in Embodiment 1.

In the present disclosure, the entire or part of a circuit, a unit, a device, a member, or a part, or the entire or part of a functional block in a block diagram may be executed by, for example, one or a plurality of electronic circuits including a semiconductor device, a semiconductor integrated circuit (IC), or a large scale integration (LSI). LSIs or ICs may be integrated on one chip or may be configured as a plurality of chips in combination. For example, functional blocks other than a storage element may be integrated on one chip. An element called as an LSI or an IC here is differently called depending on the degree of integration and may be called as a system LSI, a very-large-scale integration (VLSI), or an ultra-large-scale integration (VLSI). A field programmable gate array (FPGA) programmed after LSI manufacturing or a reconfigurable logic device in which a coupling relation inside an LSI can be reconfigured or circuit partitions inside an LSI can be set up may be used for the same purpose.

Moreover, the entire or part of functionality or operation of a circuit, a unit, a device, a member, or a part may be executed by software processing. In this case, software is recorded in one or a plurality of non-temporary recording media such as ROMs, optical disks, hard disk drives, and a function specified by the software is executed by a processor and any peripheral device when the software is executed by the processor. A system or a device may include the one or plurality of non-temporary recording media in which the software is recorded, the processor, and a necessary hardware device such as an interface.

Knowledge as the foundation of the present disclosure will be described before embodiments of the present disclosure.

A conventional distance measurement device employs a method of thoroughly irradiating inside of a scene with an optical beam by, for example, raster scanning to measure the distance to a plurality of objects scattered in a wide range in the scene. In such a method, a region in which no object exists is irradiated with the optical beam, and the order of emission of the optical beam is set in advance. Thus, for example, when a dangerous object or an important object exists in the scene, it is impossible to preferentially irradiate the object with the optical beam. For example, in a method as disclosed in PTL 3, a distance measurement device configured to perform distance measurement in a prioritized direction is added to preferentially perform optical beam irradiation in a particular direction irrespective of the order of scanning light emission.

In the method disclosed in PTL 3, a first light detection and ranging (LIDAR) that performs distance measurement in the entire circumference of a vehicle is used together with a second LIDAR that can perform farther distance measurement at a higher resolution. A distant object that cannot be sufficiently identified by the first LIDAR is identified at a high resolution by the second LIDAR. With this configuration, a controller of the vehicle detects an object based on data output from the first LIDAR and adjusts the direction of an optical beam from the second LIDAR so that the object is irradiated with light. In a configuration in which the controller determines and controls the light emission directions of a plurality of distance measurement devices as in a system of PTL 3, a calculation load on the controller is large and delay potentially occurs to communication between the controller and each distance measurement device. Thus, it is sometimes impossible to perform, at high accuracy, distance measurement of, for example, an object moving at high speed across distance measurement ranges of the plurality of distance measurement devices.

To solve the above-described problem, in the embodiments of the present disclosure, setting data that defines a light irradiation range is transmitted and received among a plurality of distance measurement devices, and each distance measurement device adaptively emits light based on the received setting data. With such a configuration, it is possible to perform more efficient target object distance measurement with a plurality of distance measurement devices.

An overview of the embodiments of the present disclosure will be described below.

A distance measurement device according to an embodiment of the present disclosure is used in a system including two or more distance measurement devices having distance measurement ranges that are adjacent to each other or partially overlap each other. The distance measurement device includes: a light emission device capable of changing an irradiation range of light; a light reception device configured to detect reflected light generated from the light emitted from the light emission device when reflected at a target object and to output a detection signal; and a processing circuit having a function to communicate with another distance measurement device in the system and configured to determine the position of the target object by calculating the distance to the target object based on the detection signal. The processing circuit generates, based on the determined position of the target object, first setting data defining an irradiation range of light to be emitted from the other distance measurement device and transmits the first setting data to the other distance measurement device, and controls light emission from the light emission device in accordance with second setting data defining an irradiation range of light to be emitted from the light emission device, when having received the second setting data from the other distance measurement device.

The "distance measurement range" of a distance measurement device means a spatial range in which the distance measurement device can perform distance measurement. The distance measurement range is the range of a three-dimensional space in which light emitted from a light emission device reaches, and when an object exists, reflected light from the object can be detected by a light reception device. In the following description, the distance measurement range is also referred to as a "visual field range". The "distance measurement ranges that are adjacent to each other" mean that the distance measurement ranges are spatially continuous or the distance measurement ranges are close to each other through a gap smaller than the size of each distance measurement range. The "irradiation range" of light means a spatial region irradiated with the light. The light emission device may be capable of changing the direction of optical beam emission. In this case, the irradiation range changes in accordance with change of the direction of optical beam emission. The light emission device may be capable of changing the degree of emitted light spreading. In this case, the irradiation range changes in accordance with change of the degree of emitted light spreading. The first setting data and the second setting data may each include, for example, information that defines at least one selected from among a group consisting of the emission direction and spreading degree of light emitted from the light emission device and the position or range of a target object to be irradiated. The irradiation range of light may be defined by such information.

In the above-described configuration, setting data defining an irradiation range of light is transmitted and received between two or more distance measurement devices having distance measurement ranges that are adjacent to each other or partially overlap each other. The light irradiation range defined by the setting data may be, for example, a range in which an important target object as a distance measurement target exists. Each distance measurement device irradiates the defined irradiation range with light in accordance with the received setting data. Accordingly, distance data of a target object moving across the distance measurement ranges of a plurality of distance measurement devices can be efficiently acquired.

The light emission device may be capable of changing a spread angle of emitted light. For example, the light emission device may be configured to be able to emit an optical beam having a relatively small spread angle and diffused light having a relatively large spread angle. Alternatively, the light emission device may be configured to be able to emit a plurality of kinds of optical beams having different spread angles. In this case, the second setting data may define a spread angle of light to be emitted from the light emission device. Similarly, the first setting data may define a spread angle of light to be emitted from the light emission device.

The first setting data may include information indicating the position of the target object the distance to which is calculated by the processing circuit. Similarly, the second setting data may include information indicating the position of a distance measurement target object. In this case, the processing circuit controls light emission from the light emission device so that the distance measurement target object is irradiated with light.

The light emission device may be capable of switching between emission of an optical beam and emission of diffused light and is capable of changing the direction of the optical beam. In this case, the second setting data may include information indicating whether light to be emitted from the light emission device is the optical beam or the diffused light, and information defining the direction of the optical beam when light to be emitted from the light emission device is the optical beam. The processing circuit may be configured to cause, in accordance with the second setting data, the light emission device to emit the diffused light or emit the optical beam in the defined direction. Similarly, the first setting data may include information indicating whether light to be emitted from the other distance measurement device is an optical beam or diffused light, and information defining the direction of the optical beam when light to be emitted from the other distance measurement device is the optical beam.

When having determined that the target object enters the distance measurement range of the other distance measurement device based on data defining the distance measurement range of the other distance measurement device and based on temporal change of the determined position of the target object, the processing circuit may be configured to generate the first setting data and transmits the first setting data to the other distance measurement device. With such operation, the first setting data can be transmitted to the other distance measurement device at an appropriate timing at which it is predicted that the target object enters the distance measurement range of the other distance measurement device, and thus the efficiency of operation can be increased.

The distance measurement range of each distance measurement device may include a first range of distance measurement with an optical beam and a second range of distance measurement with diffused light. The first range may be in the spatial range which distance measurement device may be scan by the optical beam. The processing circuit may be configured to: determine whether the target object enters the first range or the second range based on data defining the first range and the second range and based on temporal change of the determined position of the target object; when having determined that the target object enters the first range, generate the first setting data including information indicating that light to be emitted from the other distance measurement device is an optical beam and information defining the direction of the optical beam and transmit the first setting data to the other distance measurement device; and when having determined that the target object enters the second range, generate the first setting data including information indicating that light to be emitted from the other distance measurement device is diffused light and transmit the first setting data to the other distance measurement device.

The processing circuit may be configured to execute, periodically, operation that causes the light emission device to emit light and the light reception device to output the detection signal, and when having predicted that the position of the target object determined based on the detection signal enters the distance measurement range of the other distance measurement device in the next period, the processing circuit may be configured to generate the first setting data and transmits the first setting data to the other distance measurement device.

The processing circuit may be configured to transmit the first setting data to the other distance measurement device through a processing device included in the system and receive the second setting data from the other distance measurement device through the processing device. The processing device may be, for example, a server computer configured to control or manage the entire operation of the system. The processing device may simply relay the first setting data and the second setting data. Alternatively, the processing device may perform necessary processing such as coordinate transform of the first setting data and the second setting data and then relay the first setting data and the second setting data. In this manner, communication among a plurality of distance measurement devices may be performed through another device.

A system according to another embodiment of the present disclosure includes two or more distance measurement devices having distance measurement ranges that are adjacent to each other or partially overlap each other. Each of the two or more distance measurement devices includes a light emission device capable of changing an irradiation range of light, a light reception device configured to detect reflected light generated from the light emitted from the light emission device when reflected at a target object and to output a detection signal, and a processing circuit having a function to communicate with another distance measurement device in the system and configured to determine the position of the target object by calculating the distance to the target object based on the detection signal. The processing circuit generates, based on the determined position of the target object, first setting data defining an irradiation range of light to be emitted from the other distance measurement device and transmits the first setting data to the other distance measurement device, and controls light emission from the light emission device in accordance with second setting data defining an irradiation range of light to be emitted from the light emission device, when having received the second setting data from the other distance measurement device.

A method according to still another embodiment of the present disclosure is executed by a computer of a distance measurement device in a system including two or more distance measurement devices having distance measurement ranges that are adjacent to each other or partially overlap each other. The method includes: causing a light emission device to emit light, the light emission device being capable of changing an irradiation range of the light; causing a light reception device to detect reflected light generated from the light emitted from the light emission device when reflected at a target object and to output a detection signal; determining the position of the target object by calculating the distance to the target object based on the detection signal; generating, based on the determined position of the target object, first setting data defining an irradiation range of light to be emitted from another distance measurement device in the system, and transmitting the first setting data to the other distance measurement device; and controlling light emission from the light emission device in accordance with second setting data defining an irradiation range of light to be emitted from the light emission device, when having received the second setting data from the other distance measurement device.

A computer program according to another embodiment of the present disclosure is executed by a computer of a distance measurement device in a system including two or more distance measurement devices having distance measurement ranges that are adjacent to each other or partially overlap each other. The computer program causes the computer to execute: causing a light emission device to emit light, the light emission device being capable of changing an irradiation range of the light; causing a light reception device to detect reflected light generated from the light emitted from the light emission device when reflected at a target object and to output a detection signal; determining the position of the target object by calculating the distance to the target object based on the detection signal; generating, based on the determined position of the target object, first setting data defining an irradiation range of light to be emitted from another distance measurement device in the system, and transmitting the first setting data to the other distance measurement device; and controlling light emission from the light emission device in accordance with second setting data defining an irradiation range of light to be emitted from the light emission device, when having received the second setting data from the other distance measurement device.

Exemplary embodiments of the present disclosure will be described below. Note that each embodiment described below provides a comprehensive or specific example. Numerical values, shapes, constituent components, disposition positions and connection aspects of constituent components, steps, the order of steps, and the like described in the embodiments below are exemplary and not intended to limit the present disclosure. Among constituent components in the embodiments below, any constituent component not written in an independent claim indicating the highest-level concept is described as an optional constituent component. Each drawing is a schematic diagram and not necessarily precisely illustrated. In the drawings, constituent components identical to each other in effect are denoted by the same reference sign, and duplicate description thereof is omitted or simplified in some cases.

Embodiment 1

A distance measurement system according to a first exemplary embodiment of the present disclosure will be described below.

[1-1 Configuration of Distance Measurement System]

FIG. 1 is a block diagram schematically illustrating a schematic configuration of a distance measurement system 10 in the present embodiment. The distance measurement system 10 includes a plurality of distance measurement devices 100, a storage device 200, and a processing device 300. FIG. 1 also illustrates a control device included in a moving object on which the distance measurement system 10 is mounted. In the present embodiment, the control device is an element outside the distance measurement system 10, but the control device may be included in the distance measurement system 10.

Each distance measurement device 100 can communicate with any other adjacent distance measurement device 100. Each distance measurement device 100 can also communicate with the processing device 300. Communication may be performed in a wireless or wired manner and is not limited to a particular communication scheme.

Figure 2:
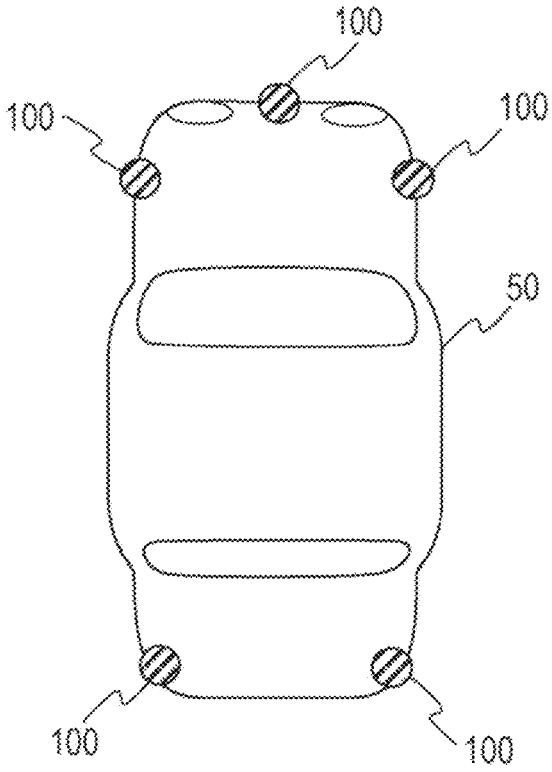
FIG. 2 is a diagram illustrating exemplary disposition of a plurality of distance measurement devices.

FIG. 2 is a diagram illustrating exemplary disposition of the plurality of distance measurement devices 100. As illustrated in FIG. 2, the plurality of distance measurement devices 100 may be mounted on a moving object 50 such as an automobile. The plurality of distance measurement devices 100 may be attached to, for example, a moving object of another kind such as a movement robot instead of an automobile. Each distance measurement device 100 may be attached outside the moving object 50 and used for sensing of an environment around the moving object 50. The storage device 200 and the processing device 300 may be disposed inside or outside the moving object 50.

The plurality of distance measurement devices 100 have respectively different ranges (referred to as "distance measurement ranges" in the present specification) in which distance measurement is possible. The distance measurement ranges of two optional adjacent distance measurement devices 100 among the plurality of distance measurement devices 100 are adjacent to each other or overlap each other. In the example illustrated in FIG. 2, distance measurement can performed in the entire 360° range around the moving object 50 by five distance measurement devices 100.

Figures 3, 4A, 4B:
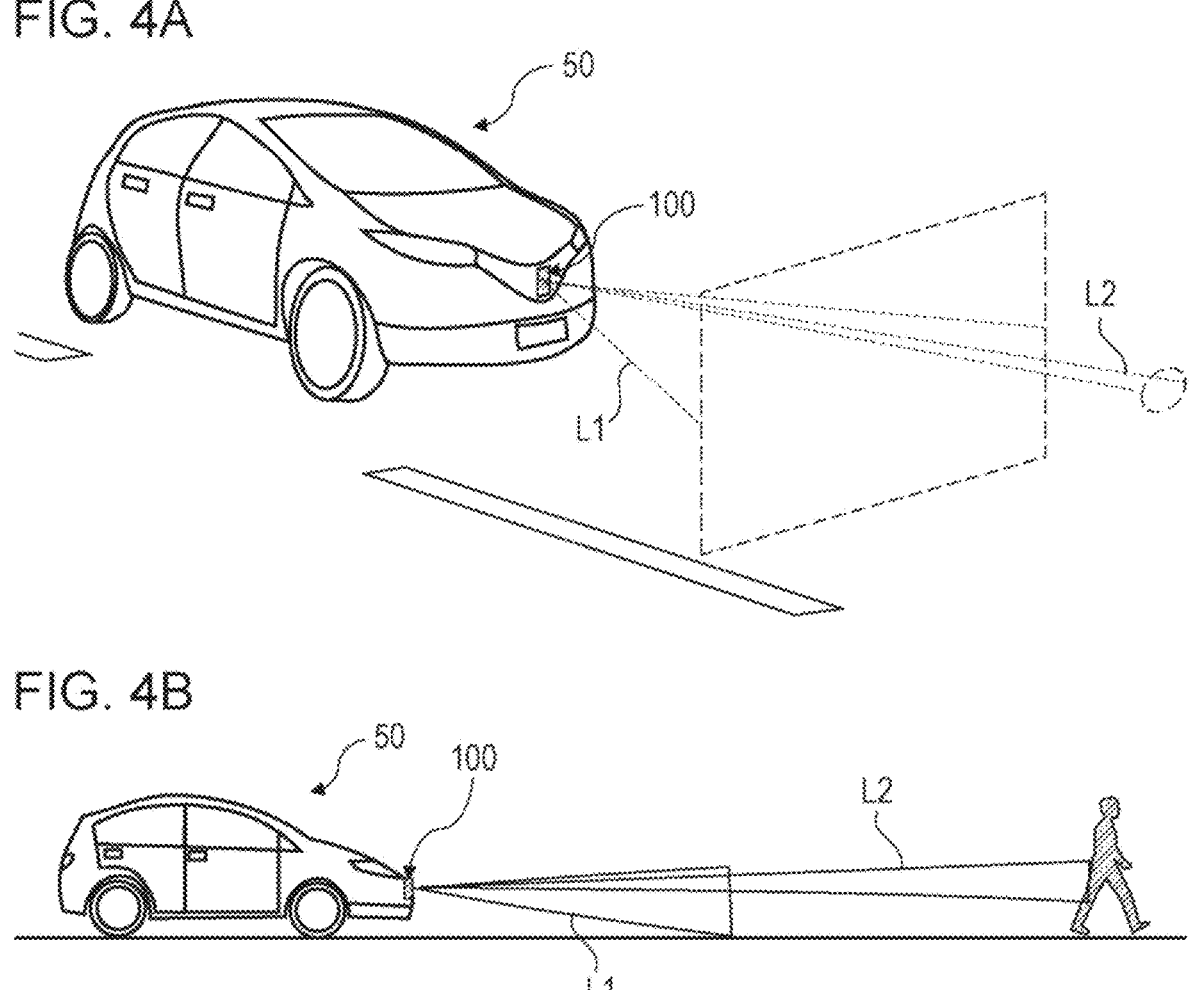
FIG. 3 is a block diagram illustrating an exemplary configuration of each distance measurement device.
FIG. 4A is a diagram schematically illustrating an exemplary irradiation range of each of an optical beam and flash light.
FIG. 4B is a diagram schematically illustrating the exemplary irradiation range of each of an optical beam and flash light.

FIG. 3 is a block diagram illustrating an exemplary configuration of each distance measurement device 100. The distance measurement device 100 includes a light emission device 110, a light reception device 120, a storage medium 140, and a processing circuit 180. The processing circuit 180 includes a processor 130, a control circuit 150, and a communication circuit 160. The communication circuit 160 includes a reception circuit 162 and a transmission circuit 164.

The light emission device 110 in the present embodiment can emit an optical beam having a small spread angle and a narrow irradiation range and flash light that is diffused light having a large spread angle and a wide irradiation range. The light emission device 110 may individually include a light source configured to emit the optical beam and a light source configured to emit flash light. Alternatively, the light emission device 110 may include one light source capable of emitting both the optical beam and the flash light. The light emission device 110 may be configured to be able to emit a plurality of kinds of optical beams and flash light having different spread angles by changing the spread angle of emitted light.

FIGS. 4A and 4B are diagrams schematically illustrating an exemplary irradiation range of each of the optical beam and the flash light. FIGS. 4A and 4B illustrate exemplary light emitted from the light emission device 110 of a distance measurement device 100 attached at the front-side center of the moving object 50 that is an automobile. The light emission device 110 can switch emission of flash light L1 and emission of an optical beam L2. The flash light L1 is diffused light that widely irradiates the front side of the distance measurement device 100 and thus has a relatively short reach distance. The optical beam has a narrowed light beam flux and thus reaches a relatively far target object.

In FIGS. 4A and 4B, the positions of the light sources of the flash light L1 and the optical beam L2 are illustrated as the same point, but the positions of the light sources may be different from each other. In other words, the light emission device 110 may emit the flash light L1 and the optical beam L2 from the two respective light sources separated from each other. However, the flash light L1 and the optical beam L2 are emitted at such angles that reflected light from a target object, which is generated through irradiation with the light can be received by the light reception device 120. As illustrated in FIGS. 4A and 4B, the irradiation range of the flash light L1 and the irradiation range of the optical beam L2 overlap each other. The light emission device 110 can emit the optical beam L2 in an optional direction in such a range that the reflected light can be received by the light reception device 120. Distance measurement in a range equivalent to the visual field range of the flash light L1, which is illustrated with a dashed line frame in FIG. 4A, is possible by scanning in which the emission direction is sequentially changed.

The light emission device 110 may include the light source configured to emit the flash light, the light source configured to emit the optical beam such as laser, and at least one movable mirror such as an MEMS mirror. The emitted optical beam is reflected by the movable mirror and moves toward a predetermined region in a scene. The control circuit 150 can change the direction of the optical beam emitted from a second light source by driving the movable mirror. Accordingly, scanning with the optical beam is possible.

A light source capable of changing the direction of light emission with a structure different from that of a light emission device including a movable mirror may be used. For example, a light emission device including a reflective waveguide as disclosed in PTL 1 may be used. Alternatively, a light emission device configured to adjust the phase of light output from each antenna with an antenna array to change the light direction of the entire array may be used.

The light reception device 120 detects reflected light generated from light emitted from the light emission device 110 when reflected by a target object and outputs a detection signal. The light reception device 120 may be, for example, an image sensor including a plurality of two-dimensionally arrayed light receiving elements. The distance measurement device 100 can measure the distance to a target object by using, for example, ToF technologies. For example, for each light receiving element, it is possible to measure the time of fright (ToF) of light, in other words, a time between light emission and reception and calculate the distance from the time and the speed of light. The ToF technologies have schemes such as a direct ToF scheme and an indirect ToF scheme. The distance measurement device 100 may measure the distance by any of the schemes. The light reception device 120 is not limited to an image sensor. For example, the light reception device may include a single light receiving element or an array of a small number of light receiving elements. The scheme of distance measurement is not limited to the direct ToF scheme nor the indirect ToF scheme but may be, for example, a frequency-modulated continuous-wave (FMCW) scheme. In the following description, unless otherwise stated, the light reception device 120 is an image sensor including a plurality of two-dimensionally arrayed light receiving elements and performs distance measurement by the indirect ToF scheme.

The image sensor may be, for example, a charge-coupled device (CCD) sensor, a complementary metal oxide semiconductor (CMOS) sensor, or an infrared array sensor. Each light receiving element includes a photoelectric conversion element such as a photodiode, and one or more electric charge accumulation units. Electric charge generated through photoelectric conversion is accumulated in the electric charge accumulation units in an exposure duration. The electric charge accumulated in the electric charge accumulation units is output after the exposure duration ends. In this manner, each light receiving element outputs an electric signal in accordance with the amount of light received in the exposure duration. The electric signal is also referred to as a "detection signal". The image sensor may be an image capturing element of a monochrome type or may be an image capturing element of a color type. For example, an image capturing element of a color type including R/G/B, R/G/B/IR, R/G/B/W filters may be used. The image sensor is not limited to a visible wavelength range but may have detection sensitivity in, for example, ultraviolet, near-infrared, mid-infrared, and far-infrared wavelength ranges. The image sensor may be a sensor including a single photon avalanche diode (SPAD). The image sensor may have an electronic shutter scheme, in other words, a global shutter mechanism in which exposure of all pixels is performed all at once. The electronic shutter scheme may be a rolling shutter scheme in which exposure is performed row by row or an area shutter scheme in which exposure is performed only in a partial area in accordance with the irradiation range of an optical beam.

The image sensor receives reflected light in each of a plurality of exposure durations having different start and end timings with reference to the emission timing of light from the light emission device 110 and outputs a signal indicating a received-light quantity for each exposure duration.

The control circuit 150 determines the direction and timing of light emission by the light emission device 110 and outputs a control signal that instructs light emission to the light emission device 110. In addition, the control circuit 150 determines the timing of exposure of the light reception device 120 and outputs, to the light reception device 120, a control signal that instructs exposure and signal outputting.

The processor 130 acquires the signals output from the light reception device 120 and indicating electric charge accumulated in the plurality of different exposure durations, and calculates the distance to a target object based on the signals. The processor 130 calculates, based on the ratio of electric charge accumulated in the plurality of respective exposure durations, a time from emission of an optical beam from the light emission device 110 to reception of a reflected optical beam by the light reception device 120, and calculates the distance from the time. Such a distance measurement scheme is referred to as the indirect ToF scheme.

Figure 5A:
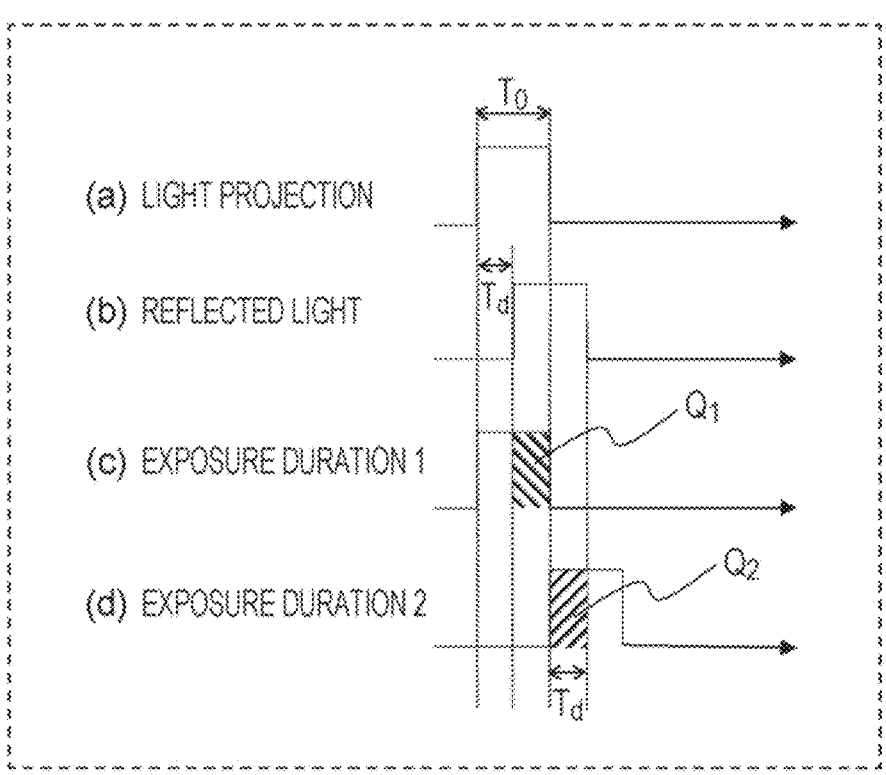
FIG. 5A is a diagram illustrating an example of indirect ToF distance measurement.

FIG. 5A is a diagram illustrating an example of the timing of light projection, the timing of reflected light arrival, and the timings of two times of exposure in the indirect ToF scheme. The horizontal axis represents time. Rectangular parts represent the durations of light projection, reflected light arrival, and the two times of exposure. In this example, for simplification, one light pulse is emitted and a light receiving element that receives reflected light generated by the light pulse consecutively performs two times of exposure. (a) in FIG. 5A illustrates a timing at which light is emitted from a light source. The pulse width is denoted by TO. (b) in FIG. 5A illustrates a duration in which a light pulse emitted from the light source and reflected by an object arrives at an image sensor. The time of fright of the light pulse is denoted by Td. In the example illustrated in FIG. 5A, the reflected light reaches the image sensor in a time Td shorter than the time width TO of the light pulse. (c) in FIG. 5A illustrates a first exposure duration of the image sensor. In this example, exposure is started simultaneously with start of light projection and is ended simultaneously with end of the light projection. In the first exposure duration, light having returned earlier among the reflected light is subjected to photoelectric conversion and generated electric charge is accumulated. Energy of the light photoelectrically converted in the first exposure duration is denoted by Q1. The energy Q1 is proportional to the amount of electric charge accumulated in the first exposure duration. (d) in FIG. 5A illustrates a second exposure duration of the image sensor. In this example, the second exposure duration is started simultaneously with end of light projection and is ended when a time equal to the pulse width TO of the light pulse, in other words, a time equal to the first exposure duration has elapsed. Energy of light photoelectrically converted in the second exposure duration is denoted by Q2. The energy Q2 is proportional to the amount of electric charge accumulated in the second exposure duration. In the second exposure duration, light having arrived after the first exposure duration ends among the reflected light is received. Since the length of the first exposure duration is equal to the pulse width TO of the light pulse, the time width of the reflected light received in the second exposure duration is equal to the time Td of fright.

The integral capacity of electric charge accumulated at the light receiving element in the first exposure duration is represented by Cfd1, the integral capacity of electric charge accumulated at the light receiving element in the second exposure duration is represented by Cfd2, photocurrent is represented by Iph, and an electric charge forwarding clock rate is represented by N. Output voltage from the light receiving element in the first exposure duration is expressed as Vout1 below.

$$Vout1=Q1/Cfd1=N{\times}Iph{\times}(T0-Td)/Cfd1$$

Output voltage from the light receiving element in the second exposure duration is expressed as Vout2 below.

$$Vout2=Q2/Cfd2=N{\times}Iph{\times}Td/Cfd2$$

In the example illustrated in FIG. 5A, since the time length of the first exposure duration is equal to the time length of the second exposure duration, Cfd1=Cfd2 is obtained. Thus, Td can be expressed by an equation below.

$$Td=\{Vout2/(Vout1+Vout2)\}{\times}T0$$

When the speed of light is represented by C ($\approx3{\times}108$ m/s), the distance L between the device and the object is expressed by an equation below.

$$L={\frac{1}{2}}{\times}C{\times}Td={\frac{1}{2}}{\times}C{\times}\{Vout2/(Vout1+Vout2)\}{\times}T0$$

In reality, the image sensor cannot continuously perform two times of exposure in some cases because the image sensor outputs electric charge accumulated in an exposure duration. In this case, for example, a method illustrated in FIG. 5B may be used.

Figure 5B:
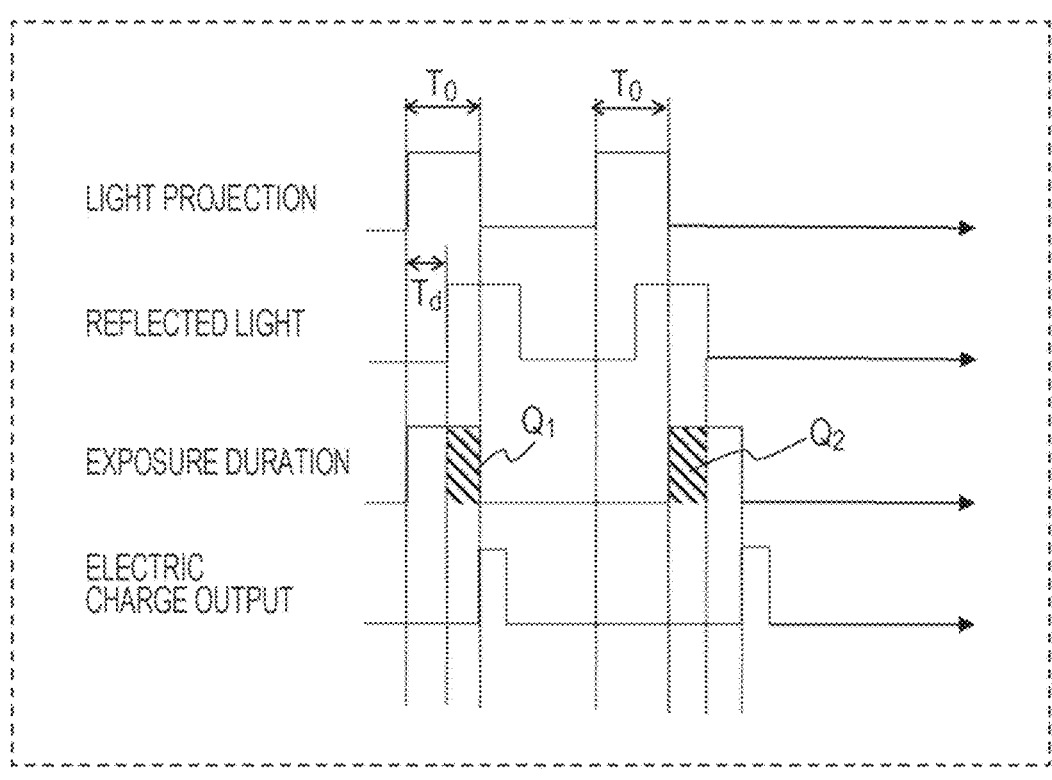
FIG. 5B is a diagram illustrating another example of indirect ToF distance measurement.

FIG. 5B is a diagram schematically illustrating the timings of light projection, exposure, and electric charge outputting in a case in which two continuous exposure durations cannot be provided. In the example illustrated in FIG. 5B, first, the image sensor starts exposure simultaneously with start of light projection by a light source and ends the exposure simultaneously with end of the light projection by the light source. This exposure duration corresponds to Exposure Duration 1 in FIG. 5A. Right after the exposure, the image sensor outputs electric charge accumulated in the exposure duration. The amount of the electric charge corresponds to the energy Q1 of received light. Subsequently, the light source starts light projection again and ends the light projection when the same time TO as in the first time has elapsed. The image sensor starts exposure simultaneously with the end of the light projection by the light source and ends the exposure when a time length equal to the first exposure duration has elapsed. This exposure duration corresponds to Exposure Duration 2 in FIG. 5A. Right after the exposure, the image sensor outputs electric charge accumulated in the exposure duration. The amount of the electric charge corresponds to the energy Q2 of received light.

In this manner, in the example illustrated in FIG. 5B, in order to acquire the above-described signal for distance calculation, the light source performs two times of light projection and the image sensor performs exposure at different timings for the respective times of light projection. In this manner, even when two exposure durations cannot be continuously provided in time, voltage can be acquired for each exposure duration. In this manner, to obtain information of electric charge accumulated in each of a plurality of exposure durations set in advance, such an image sensor configured to output electric charge for each exposure duration projects light in the same condition in a number of times equal to the number of the set exposure durations.

Note that, in actual distance measurement, the image sensor may receive not only light emitted from the light source and reflected by the object but also background light, in other words, external light such as the sun light or light from a nearby illumination or the like. Thus, an exposure duration for measuring accumulated electric charge due to background light incident on the image sensor in a state in which no light pulse is emitted is typically provided. An electric charge amount when only reflected light of a light pulse is received can be calculated by subtracting an electric charge amount measured in the exposure duration for background light from an electric charge amount measured when reflected light of the light pulse is received. In the present embodiment, description of operation for background light is omitted for simplification.

In this example, indirect ToF distance measurement is performed but direct ToF distance measurement may be performed. In a case in which direct ToF distance measurement is performed, the light reception device 120 includes a sensor in which light receiving elements each provided with a timer counter are two-dimensionally disposed along a light receiving surface. Each timer counter starts time measurement at exposure start and ends the time measurement at a timing when the light receiving element receives reflected light. In this manner, the timer counters perform time measurement for the respective light receiving elements and directly measure the time of fright of light. The processor 130 calculates distance from the measured time of fright of light.

The processor 130 acquires a detection signal output from the light reception device 120 for each pixel and calculates the distance to an object for each pixel. A result of the calculation may be recorded as, for example, data of a two-dimensional image having a distance value as a pixel value, in other words, distance image data. Alternatively, the calculation result may be recorded as three-dimensional point group data. The point group data may be generated through conversion of the position and distance values of each pixel of a distance image into, for example, the coordinates of a point on a three-dimensional coordinate system having an origin at the position of the light reception device 120. Data of pixel positions and pixel values of the distance image or data of coordinates in the point group data is handled as data indicating the position of the object. The processor 130 records the generated distance image data or point group data in the storage device 200 and transmits the generated distance image data or point group data to the processing device 300.

In addition, the processor 130 converts data indicating the position of a particular target object, which is acquired by the distance measurement device 100 into data expressed in a coordinate system set to the light reception device of another distance measurement device adjacent to the distance measurement device 100. In the following description, a distance measurement device 100 of interest is also referred to as "the own distance measurement device 100", and another distance measurement device adjacent to the own distance measurement device 100 is also referred to as an "adjacent distance measurement device". The number of distance measurement devices adjacent to each distance measurement device 100 is two in the present embodiment but may be one or may be three or more. The processor 130 determines whether distance measurement of a target object the distance to which is measured and the position of which is specified by the own distance measurement device 100 can be performed by each adjacent distance measurement device. When distance measurement of the target object can be performed by each adjacent distance measurement device, the processor 130 additionally calculates whether the target object is located at a position where distance measurement with flash light is possible or a position where distance measurement with an optical beam is possible. In addition, the processor 130 determines an illumination kind and an irradiation direction based on illumination data received from each adjacent distance measurement device. Details of this operation will be described later.

The storage medium 140 includes a memory such as a ROM or a RAM and stores a computer program to be executed by the processor 130. The storage medium 140 also stores data indicating the relative positions of the own distance measurement device 100 and each adjacent distance measurement device. The data is used in processing that converts the position of a target object in the coordinate system of the own distance measurement device 100 into the position of the target object in the coordinate system of the adjacent distance measurement device.

FIG. 6A is a diagram illustrating exemplary data stored in the storage medium 140. As illustrated in FIG. 6A, for each distance measurement device adjacent to the own distance measurement device 100, the storage medium 140 stores, as fixed values, the position of the origin, a range in which distance measurement with flash light is possible, and a range in which distance measurement with an optical beam is possible. The position of the origin of each adjacent distance measurement device may be set to be, for example, a central position on the light receiving surface of the light reception device in the distance measurement device. The origin of the position of each adjacent distance measurement device is expressed in the coordinate system of the own distance measurement device 100. In the example illustrated in FIG. 6A, the flash-light and optical-beam distance measurement ranges of each adjacent distance measurement device are each recorded as values obtained by expressing, in a three-dimensional coordinate system set to the own distance measurement device 100, positions at maximum distance between two pixels of the upper-left corner and the lower-right corner of the light reception device 120.

Instead of the data illustrated in FIG. 6A, data in another format for performing coordinate transform between the coordinate system of the own distance measurement device 100 and the coordinate system of each adjacent distance measurement device may be recorded in the storage medium 140. For example, parameters of an affine transform for converting the coordinate system of the own distance measurement device 100 into the coordinate system of each adjacent distance measurement device, and a distance measurement range with flash light and a distance measurement range with an optical beam, which are expressed in the coordinate system of each adjacent distance measurement device may be recorded. The processor 130 performs, in accordance with the contents of data stored in the storage medium 140, conversion processing for enabling comparison of the position of a target object, which is expressed in the coordinate system of the own distance measurement device 100 with the distance measurement range with flash light and the distance measurement range with an optical beam, which are expressed in the coordinate system of an adjacent distance measurement device.

In addition, various kinds of data generated by the processor 130 in the course of processing is recorded in the storage medium 140. FIG. 6B is a diagram illustrating exemplary data recorded in the storage medium 140 in the course of processing. In this example, information of one or more target objects detected in a scene is recorded in the storage medium 140. An "target object" means a tracking target as a distance measurement target over a plurality of frames. The processor 130 records, in the storage medium 140, information necessary for target object tracking by the own distance measurement device 100 and information to be passed to an adjacent distance measurement device. In the example illustrated in FIG. 6B, the storage medium 140 stores a target object ID for identifying a detected target object, a code that identifies a template for detecting a target object, a position in the previous frame, a position in the current frame, an estimated position in the next frame, an illumination kind in the next frame, an irradiation direction in the next frame, and a light irradiation range in the next frame. The illumination kind may be designated by a code indicating whether used light is an optical beam or flash light. The irradiation range indicates the scanning range of an optical beam and may be expressed in, for example, angle. Note that, when a light source configured to emit an optical beam is configured to be able to change the spread angle of the beam, the spread angle of the beam may be recorded. The processor 130 generates information of a tracking target object based on distance measurement data acquired by the own distance measurement device 100 or data transmitted from an adjacent distance measurement device. The information of a target object is updated for each frame. The information of a target object may be deleted when tracking of the target object has become impossible with the own distance measurement device 100, in other words, when the target object has moved out of the visual field, which is the distance measurement range, of the distance measurement device 100.

The control circuit 150 determines, in accordance with a result of calculation by the processor 130, the kind of light emitted from the light emission device 110 and determines the irradiation direction and irradiation timing of the light emission device 110. The control circuit 150 adjusts the exposure timing of the light reception device 120 in synchronization with the irradiation timing of the light emission device 110. Accordingly, the control circuit 150 controls distance measurement operation of the own distance measurement device 100. Note that functions of the processor 130 and the control circuit 150 may be integrated in one circuit.

The communication circuit 160 is a circuit for communicating with other distance measurement devices and the processing device 300. The communication circuit 160 performs signal transmission and reception by a method that is compliant to an optional communication standard. The communication circuit 160 may perform communication by any of wireless and wired methods. The communication circuit 160 includes the reception circuit 162 and the transmission circuit 164.

The reception circuit 162 receives position information and illumination information of a target object, which are transmitted from a distance measurement device adjacent to the own distance measurement device 100.

The transmission circuit 164 transmits distance image data or point group data generated by the processor 130 to the processing device 300. The transmission circuit 164 also transmits, to an adjacent distance measurement device, position information of a target object the position of which is determined by the processor 130 in the coordinate system of the adjacent distance measurement device, and information of an illumination kind and an illumination direction in accordance with the position.

Figure 6C:
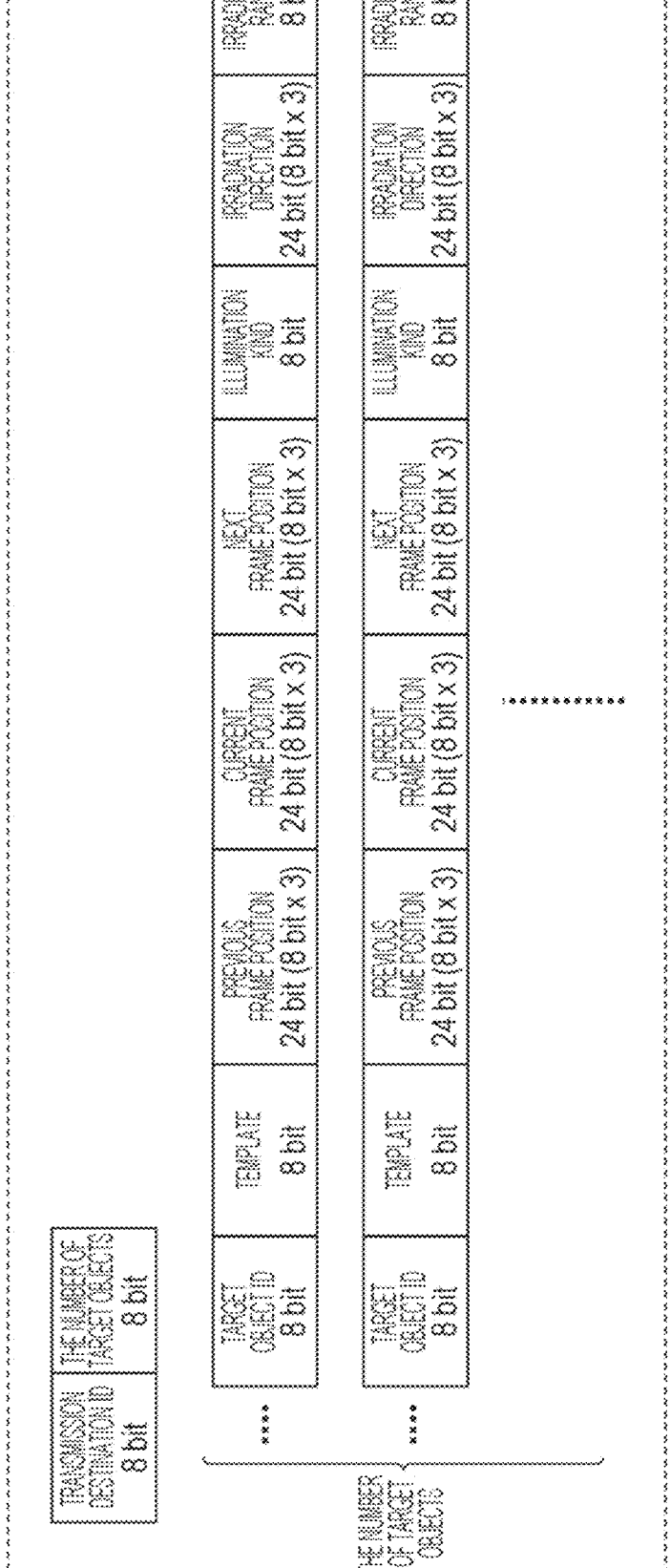
FIG. 6C is a diagram illustrating an exemplary format of data transmitted and received between adjacent distance measurement devices.

FIG. 6C is a diagram illustrating an exemplary format of setting data transmitted and received between adjacent distance measurement devices 100. The setting data defines the irradiation range of light to be emitted from the light emission device 110 of a distance measurement device at a transmission destination. In the present embodiment, the setting data includes a transmission destination ID that identifies a distance measurement device at a transmission destination, information indicating the number of target objects, and information of each target object recorded in the storage medium 140. In the example illustrated in FIG. 6C, for each target object, data of an ID that identifies the target object, a code that designates a template for detecting the target object, a position in the previous frame, a position in the current frame, a position in the next frame, an illumination kind, a beam irradiation direction, and a beam scanning range is transmitted. Note that the beam irradiation direction and the target object position in the next frame are equivalent data, and thus one of the data may be omitted. Transmission data related to illumination may be adjusted in accordance with the kind and any adjustable item (for example, a beam spread angle) of illumination that can be emitted from an adjacent distance measurement device. Data of the target object positions in the previous frame, the current frame, and the next frame is record and transmitted as, for example, three-dimensional coordinate values. Alternatively, each target object position data may be record and transmitted as a combination of two-dimensional coordinate values and a distance value. Data illustrated in FIG. 6C includes information (in other words, "tracking information") of a target object to be tracked. In the following description, this data is also referred to as "tracking data".

Figures 7, 8:
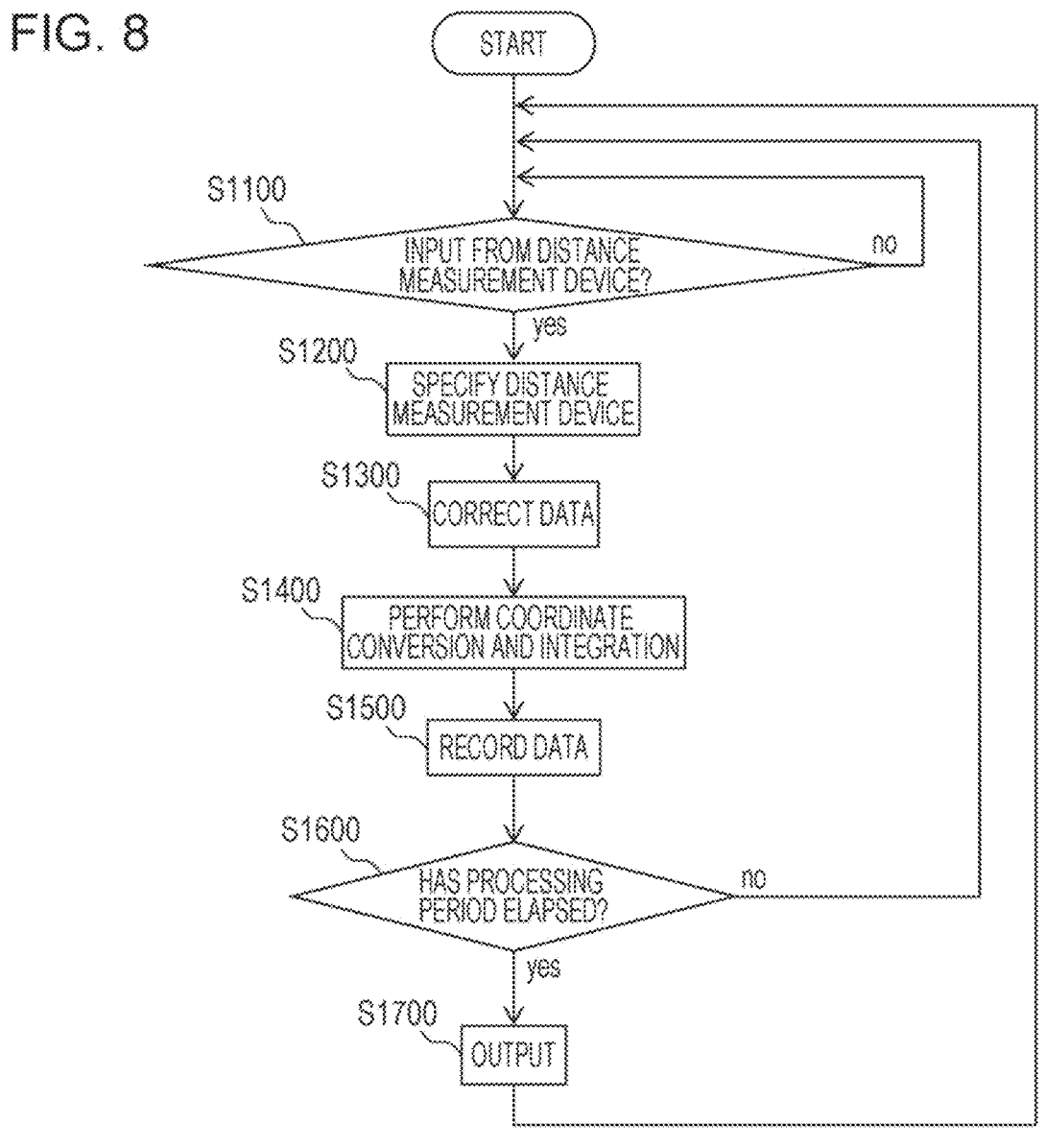
FIG. 7 is a diagram illustrating exemplary information stored in a storage device.
FIG. 8 is a flowchart illustrating exemplary operation of a processing device.

The storage device 200 stores information of the installation positions and angles of the plurality of distance measurement devices 100. FIG. 7 is a diagram illustrating exemplary information stored in the storage device 200. In this example, the storage device 200 stores an installation position, an installation angle, and a correction value for each distance measurement device 100. The installation position may be expressed as a point in a three-dimensional coordinate system set to the distance measurement system 10. The origin of the three-dimensional coordinate system may be set to be, for example, a specific point such as the barycenter position of a device or an object such as a moving object on which the distance measurement system 10 is installed. The installation angle may be expressed as, for example, a vector with which the normal direction of the light receiving surface of the light reception device 120 included in the distance measurement device 100 is expressed in the above-described three-dimensional coordinate system. The correction value is, for example, a value for correcting distance measurement range difference generated due to difference in an output from the light emission device 110 of each distance measurement device 100. The correction value is used to correct, for example, coordinate difference generated by sensor position or orientation difference due to attachment error at manufacturing or the like. In the example illustrated in FIG. 7, the correction values of coordinates in x, y, z directions are recorded as an example. The correction values of angles may be recorded in addition to the correction values of coordinates.

The processing device 300 is a computer configured to perform wired or wireless communication with the plurality of distance measurement devices 100 and process data output from each distance measurement device 100. The processing device 300 converts distance image data or point group data that is sequentially output from each distance measurement device 100 into position data in a three-dimensional coordinate system unified in the entire distance measurement system 10. The processing device 300 converts received data based on information indicating characteristics of each distance measurement device 100, such as the installation position and installation angle of the distance measurement device 100, which is stored in the storage device 200.

In the present embodiment, processing of converting data expressed in a coordinate system set to each distance measurement device 100 into data expressed in the three-dimensional coordinate system unified in the entire distance measurement system 10 is executed by the processing device 300. However, the present disclosure is not limited to such a configuration. For example, the processor 130 of each distance measurement device 100 may convert data from the coordinate system of the own distance measurement device 100 into the coordinate system unified in the entire distance measurement system 10 and transmit the converted data to the processing device 300. In this case, the storage medium 140 in each distance measurement device 100 stores data necessary for performing coordinate transform. For example, data indicating the position and orientation of the own distance measurement device 100 in the coordinate system unified in the entire distance measurement system 10 may be recorded in the storage medium 140. The position of the own distance measurement device 100 may be expressed with, for example, the coordinates of the central position on the light receiving surface of the light reception device 120. The orientation of the own distance measurement device 100 may be expressed with, for example, the normal vector of the light receiving surface of the light reception device 120.

[1-2 Operation of Distance Measurement System]

[1-2-1 Operation of Processing Device]

Operation of the processing device 300 will be described below.

FIG. 8 is a flowchart illustrating the operation of the processing device 300. The processing device 300 executes operation at steps S1100 to S1700 illustrated in FIG. 8. The following describes the operation at each step.

(Step S1100)

The processing device 300 determines whether distance data is input from one or more of the plurality of distance measurement devices 100. The distance data may be transmitted as distance image data or three-dimensional point group data as described above. When inputting is performed from a distance measurement device 100, the process proceeds to step S1200. When no inputting is performed from a distance measurement device 100, the process repeats step S1100.

(Step S1200)

The processing device 300 specifies, based on information such as an ID or a transmission source address included in the data input at step S1100, a distance measurement device 100 having transmitted the data.

(Step S1300)

The processing device 300 refers to the storage device 200, acquires data of a correction value corresponding to the distance measurement device 100 specified at step S1200, and corrects the distance data acquired at step S1100 by using the correction value.

(Step S1400)

The processing device 300 refers to the storage device 200, acquires data of an installation position and an installation angle corresponding to the distance measurement device 100 specified at step S1200, and converts the distance data acquired at step S1100 based on the data. Specifically, distance data in a three-dimensional coordinate system set to the distance measurement device 100 is converted into position data in a three-dimensional coordinate system that is common to the entire distance measurement system 10. Accordingly, the distance data acquired from the plurality of distance measurement devices 100 is integrated with position data, in other words, point group data in the common three-dimensional coordinate system.

(Step S1500)

The processing device 300 records the position data converted and integrated at step S1400 in the storage device 200.

(Step S1600)

The processing device 300 determines whether a predetermined processing period or sampling period has elapsed since the timing of previous outputting or the timing of processing start. The processing period is a time width in which the distance data sequentially input from each distance measurement device 100 is integrated and output. When the processing period has elapsed, the process proceeds to step S1700. When the processing period has not elapsed yet, the process returns to step S1100.

The processing device 300 repeats steps S1100 to S1600 until it is determined at step S1600 that the predetermined processing period has elapsed. Accordingly, the distance data acquired by each of the plurality of distance measurement devices 100 in the constant time width is integrated with position data in the three-dimensional coordinate system common to the entire distance measurement system 10.

(Step S1700)

The processing device 300 outputs the position data converted from the distance data acquired by the plurality of distance measurement devices 100 in the processing period. The outputting destination may be, for example, a control device of a moving object on which the distance measurement system 10 is mounted. The control device executes necessary operation such as collision avoidance based on the output position data.

[1-2-2 Operation of Distance Measurement Device]

Operation of each distance measurement device 100 will be described below.

Figure 9:
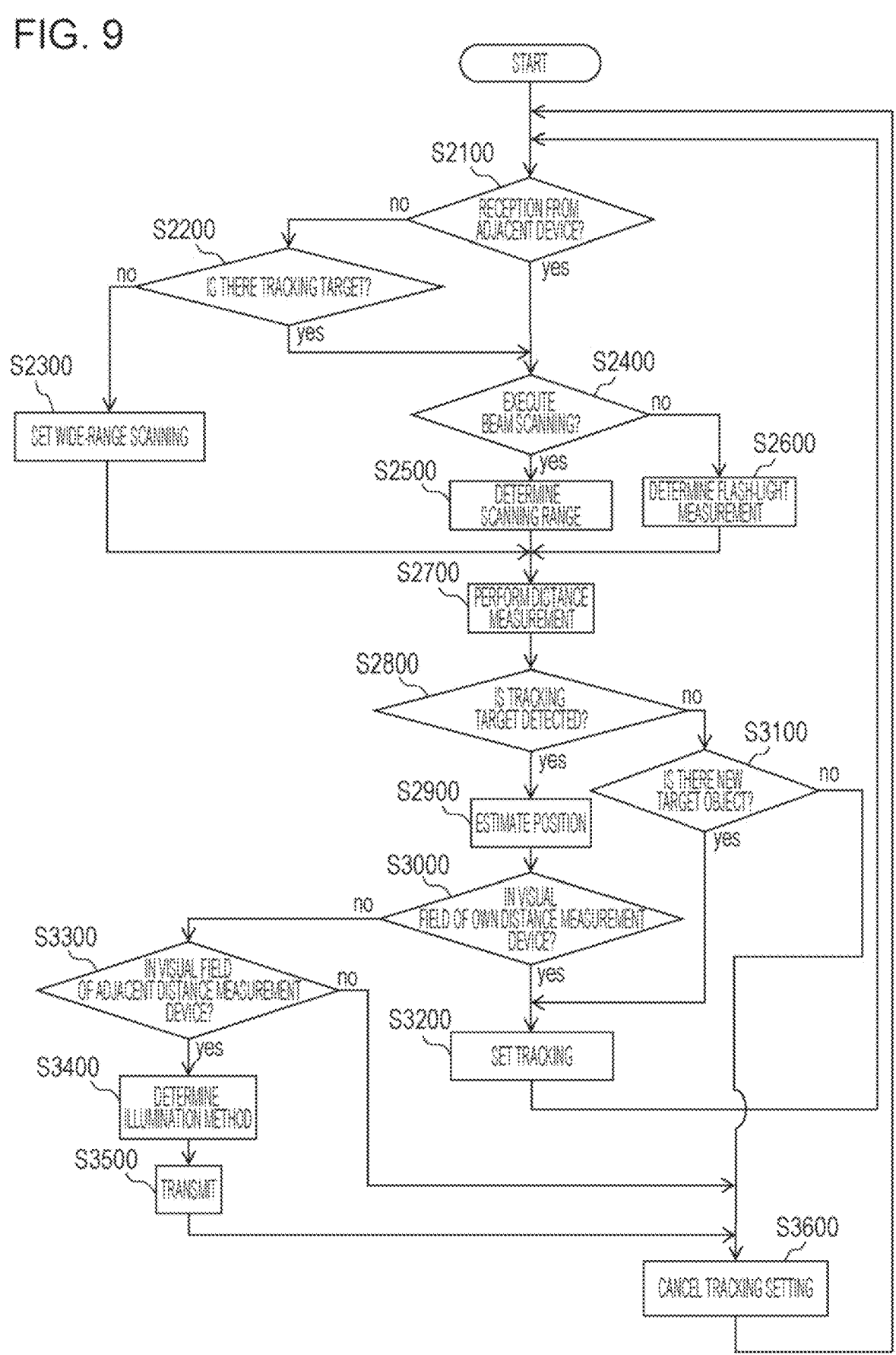
FIG. 9 is a flowchart illustrating exemplary operation of each distance measurement device.

FIG. 9 is a flowchart illustrating exemplary operation of each distance measurement device 100. Each distance measurement device 100 in the present embodiment has a function to detect and track a target object such as a pedestrian or a vehicle in a scene by repeatedly executing distance measurement using an optical beam or flash light. Each distance measurement device 100 also has a function to adaptively select an irradiation method suitable for distance measurement of an individual target object and perform the distance measurement by transmitting and receiving information related to the position of the target object and information related to illumination to and from another adjacent distance measurement device 100. Distance measurement operation of each distance measurement device 100 and operation of data communication with an adjacent distance measurement device will be described below with reference to FIG. 9.

(Step S2100)

The processor 130 determines whether the reception circuit 162 has received data from an adjacent distance measurement device 100. As illustrated in, for example, FIG. 6C, the data may include information such as a target object position expressed in the coordinate system of the own distance measurement device 100, the kind of illumination suitable for irradiation of a target object at the position, and the emission direction of a beam. When the reception circuit 162 has received no data from an adjacent distance measurement device 100, the process proceeds to step S2200. When the reception circuit 162 has received data from an adjacent distance measurement device 100, the process proceeds to step S2400.

(Step S2200)

When no data has been received from an adjacent distance measurement device 100, the processor 130 refers to the storage medium 140 and determines whether there is a tracking target object set at the previous distance measurement. When there is a tracking target object, the process proceeds to step S2400. When there is no tracking target object, the process proceeds to step S2300. In the initial state, the process proceeds to step S2300 since there is no tracking target object.

(Step S2300)

When it is determined at step S2200 that no tracking target object is designated, the control circuit 150 generates a control signal for instructing the light emission device 110 and the light reception device 120 to perform operation of detecting a target object by performing distance measurement in the entire visual field range set in advance. The control signal may be, for example, a signal that instructs the light emission device 110 and the light reception device 120 to perform combined operation of distance measurement by scanning operation in which irradiation with an optical beam is sequentially performed while the emission angle of the optical beam is changed, and distance measurement by irradiation with flash light. Through the distance measurement with flash light, distance measurement in a wide range at a relatively short distance can be executed all at once. Through the scanning operation with an optical beam, distance measurement in the entire distant visual field range can be performed. This operation is performed to detect a particular target object in a relatively wide visual field range. Note that only distance measurement by the scanning operation using an optical beam may be performed and distance measurement with flash light may be omitted. After the operation at step S2300, the process proceeds to step S2700.

(Step S2400)

The processor 130 determines whether an optical beam is designated as illumination, in other words, whether to execute beam scanning. The determination is performed by referring to illumination information included in the data received at step S2100 or illumination information associated with the target object determined as a tracking target at step S2200. When an optical beam is designated as illumination, the process proceeds to step S2500. When an optical beam is not designated as illumination, in other words, when flash light is designated, the process proceeds to step S2600.

(Step S2500)

The processor 130 refers to the illumination information included in the data received at step S2100 or the illumination information associated with the target object determined as a tracking target at step S2200 and determines a range to be irradiated with an optical beam. The range to be irradiated with an optical beam is a range including the entire or part of the target object and may differ with the size of the target object. The control circuit 150 generates a control signal for instructing the light emission device 110 and the light reception device 120 to perform operation of performing distance measurement by scanning the determined range with an optical beam. After the operation at step S2500, the process proceeds to step S2700.

(Step S2600)

When an optical beam is not designated as illumination at step S2400, the target object is included in the distance measurement range with flash light. In this case, operation of performing distance measurement and detection of the target object is performed by distance measurement operation with flash light. The control circuit 150 generates a control signal that instructs the light emission device 110 and the light reception device 120 to perform distance measurement operation with flash light. After the operation at step S2600, the process proceeds to step S2700.

(Step S2700)

The control circuit 150 outputs the control signal for instructing distance measurement based on the illumination condition set at steps S2300, S2500, or S2600 to the light emission device 110 and the light reception device 120. The light emission device 110 and the light reception device 120 perform light emission and exposure in accordance with the input control signal. Accordingly, distance data on the entire or part of a visual field range set in advance is acquired. Note that, when the kind of used illumination is flash light, distance data in the entire distance measurement range with flash light can be acquired through irradiation once. When the kind of used illumination is an optical beam, distance data in a designated range can be acquired by executing operation of emitting an optical beam and detecting reflected light a plurality of times with different directions of optical beam emission.

(Step S2800)

The processor 130 determines whether a tracking target object exists in the range in which distance measurement is performed at step S2700. The tracking target object is a target object set as a tracking target at the previous distance measurement or a target object indicated by the data received at step S2100. For example, for the distance data obtained by the distance measurement at step S2700, the processor 130 detects an object included in the distance measurement range by performing clustering based on a distance value. Alternatively, for three-dimensional point group data generated from the distance data obtained by the distance measurement at step S2700, the processor 130 detects an object included in the distance measurement range by performing clustering based on the position of a point group. Whether the detected object is a tracking target can be determined by performing matching between the object and a template of a tracking target object. As a result of the matching, when it is determined that a tracking target object exists in the distance measurement range, the process proceeds to step S2900. When it is determined that no tracking target object exists in the distance measurement range, the process proceeds to step S3100.

(Step S2900)

The processor 130 estimates the position of a target object at the next distance measurement, the target object being collated as a tracking target object at step S2800. The position estimation may be performed by, for example, calculating a movement vector of the target object. The processor 130 calculates a movement vector of movement of a target object detected by the own distance measurement device 100 or an adjacent distance measurement device before the distance measurement at step S2700 to a position specified at step S2700. The position of the target object at the next distance measurement can be estimated by doubling the magnitude of the calculated movement vector.

(Step S3000)

The processor 130 determines whether the estimated position of the target object at the next distance measurement, which is estimated at step S2900 is inside the distance measurement range of the own distance measurement device 100. When the estimated position of the target object at the next distance measurement is inside the distance measurement range of the own distance measurement device 100, the process proceeds to step S3200. When the estimated position of the target object at the next distance measurement is not in the distance measurement range of the own distance measurement device 100, the process proceeds to step S3300.

(Step S3100)

When no tracking target object is detected as a result of the matching at step S2800, the processor 130 determines whether a new target object exists in the distance measurement range at step S2700. The processor 130 performs clustering, for example, based on the distance value of each pixel for the distance image data generated at step S2700 and determines whether the shape of a cluster matches an aspect ratio and a size determined in advance. A plurality of kinds of combinations of the aspect ratio and the size determined in advance may be provided. Alternatively, the processor 130 may perform clustering based on the position of a point group for the three-dimensional point group data generated from the distance data obtained by the distance measurement at step S2700. In this case, the processor 130 determines whether the shape of each cluster matches a three-dimensional schematic shape determined in advance. The schematic shape determined in advance may be, for example, a rectangular parallelepiped. A plurality of schematic shapes may be determined. Note that, similarly to step S2800, a new target object may be detected by matching with a template determined in advance. When a new target object is detected at step S3100, the process proceeds to step S3200. When no new target object is detected, the process proceeds to step S3600.

(Step S3200)

The processor 130 sets, as a tracking target, the target object the estimated position of which at the next distance measurement is determined to be in the distance measurement range of the own distance measurement device 100 at step S3000 or the target object detected as a new target object at step S3100. The processor 130 records data such as estimated position and illumination kind of the tracking target object in the storage medium 140. The data may be recorded for each detected target object as illustrated in, for example, FIG. 6B. After step S3200, the process returns to step S2100.

(Step S3300)

When it is determined at step S3000 that the estimated position of the target object at the next distance measurement is not in the visual field of the own distance measurement device 100, the own distance measurement device 100 cannot continue tracking of the target object. Thus, the processor 130 determines whether the estimated position of the target object at the next distance measurement is inside the visual field of an adjacent distance measurement device 100, in other words, whether the tracking can be continued by an adjacent distance measurement device 100. The determination is performed by referring to data in the storage medium 140 as illustrated in, for example, FIG. 6A. When the estimated position of the target object is included in the distance measurement range of an adjacent distance measurement device with flash light or an optical beam, the processor 130 determines that the estimated position of the target object is inside the visual field range of the adjacent distance measurement device. The storage medium 140 may store conversion parameters for conversion from the coordinate system of the own distance measurement device 100 into the coordinate system of each adjacent distance measurement device, and flash-light and optical-beam distance measurement ranges expressed in the coordinate system of each adjacent distance measurement device. In this case, the processor 130 converts the estimated position of the target object into an expression in the coordinate system of the adjacent distance measurement device and then determines whether the estimated position is inside the distance measurement range of the adjacent distance measurement device. The conversion may be performed by, for example, an affine transform with rotation and translation. When the estimated position of the target object is inside the visual field range of an adjacent distance measurement device 100, the process proceeds to step S3400. When the estimated position of the target object is not in the visual field range of any adjacent distance measurement device 100, the process proceeds to step S3600.

(Step S3400)

The processor 130 refers to information of the light irradiation range of the adjacent distance measurement device, which is recorded in the storage medium 140, and determines an illumination method suitable for the adjacent distance measurement device to perform distance measurement of the target object. Flash light is selected when the estimated position of the target object is inside the distance measurement range with flash light, or an optical beam is selected when the estimated position of the target object is inside the distance measurement range with an optical beam. When an optical beam is selected, the direction of optical beam emission is determined. The direction of optical beam emission is determined to be a direction in which the optical beam is emitted to the estimated position of the target object.

(Step S3500)

The transmission circuit 164 generates transmission data including the estimated position of the target object, which is expressed in the coordinate system of the adjacent distance measurement device and information of the illumination method determined at step S3400, and transmits the transmission data to the adjacent distance measurement device. The transmission data may be data in a format as illustrated in, for example, FIG. 6C. Note that information of a plurality of target objects is collectively transmitted in the example illustrated in FIG. 6C but may be individually transmitted for each target object. In this case, information of the number of target objects is omitted from the transmission data. Note that, when a light source capable of changing the spread angle of an optical beam is used, information of the spread angle of an optical beam may be included in the transmission data. When the adjacent distance measurement device is configured to be able to emit only one of an optical beam and flash light, only information of any one of an optical beam and flash light may be included in the transmission data. After step S3500, the process proceeds to step S3600.

(Step S3600)

When no new target object is detected at step S3100, when it is determined at step S3300 that the estimated position of the target object is not in the visual field of an adjacent distance measurement device, or when the data transmission at step S3500 is completed, tracking setting cancellation processing is performed. The processor 130 deletes information of the tracking target recorded in the storage medium 140 and cancels tracking of the target object. After step S3600, the process returns to step S2100.

Each distance measurement device 100 can transmit and receive, to and from an adjacent distance measurement device, information of the tracking target and information of illumination used for distance measurement of the tracking target by repeating the operation at steps S2100 to S3600. Accordingly, each distance measurement device 100 can adaptively irradiate the tracking target with light. Thus, for example, the frequency of scanning a distant region with an optical beam can be reduced to efficiently track the target object.

In the above-described example, the operation of detecting a new target object is performed at step S3100 only when no tracking target is detected by the matching processing at step S2800. The present disclosure is not limited to such operation, and the operation of detecting a new target object may be performed even when a tracking target is detected by the matching processing.

[1-3 Specific Examples of Operation]

The following describes, with reference to FIGS. 10A to 10D, specific examples related to switching operation performed by a distance measurement device 100 between flash light and an optical beam and tracking handover operation performed between two adjacent distance measurement devices 100.

Figure 10A:
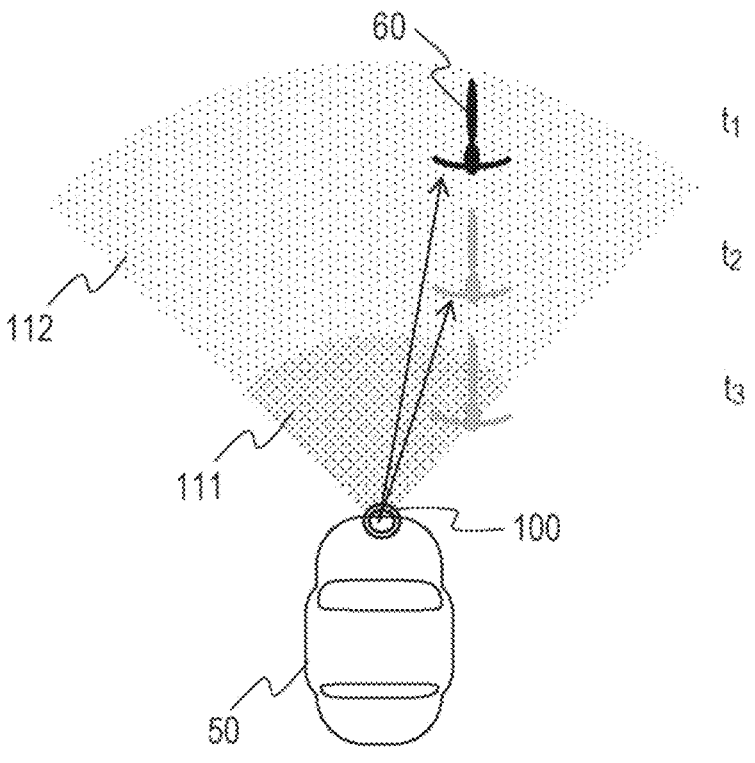
FIG. 10A is a diagram illustrating an exemplary situation in which a tracking target object moves in the visual field range of one distance measurement device.

FIG. 10A illustrates an exemplary situation in which a tracking target object 60 moves in the visual field range of one distance measurement device 100. The target object 60 in FIG. 10A is a two-wheel vehicle, and t1, t2, and t3 denote three consecutive timings of distance measurement. Time elapses in the order of t1, t2, and t3. FIG. 10A illustrates a flash-light distance measurement range 111 and an optical-beam distance measurement range 112. In the example illustrated in FIG. 10A, the distance measurement device 100 is disposed at the front-side center of the moving object 50. The target object 60 moves in a direction approaching the distance measurement device 100 from a far side in the visual field of the distance measurement device 100.

The distance measurement device 100 executes the operation illustrated in FIG. 9 at each of the time points t1, t2, and t3. In the situation illustrated in FIG. 10A, the target object 60 is positioned in the visual field of the distance measurement device 100, in other words, in the distance measurement range thereof at any of the time points t1, t2, and t3. Thus, the distance measurement device 100 does not transmit nor receive information related to the target object 60 and illumination to and from another adjacent distance measurement device. The distance measurement device 100 switches an optical beam and flash light in accordance with the position of the target object 60 moving in the own distance measurement range. Operation illustrated in FIG. 10A will be described below with reference to FIG. 9 again.

At the time point t1, the distance measurement device 100 receives no target object information from an adjacent distance measurement device at step S2100. Thus, the process proceeds to step S2200. At the timing of step S2200, the target object is not detected and tracking is not performed, and thus the process proceeds to step S2300. At step S2300, a control signal that instructs operation of performing distance measurement by wide-range scanning, in other words, sequentially irradiating the entire visual field with an optical beam is generated. At the following step S2700, the light emission device 110 and the light reception device 120 perform distance measurement by optical-beam irradiation in accordance with the control signal. The processor 130 calculates distance based on a reception result of reflected light acquired for the entire visual field. For example, the processor 130 generates a distance image based on a result of reflected-light detection at each pixel of the light reception device 120. At the following step S2800, the processor 130 performs matching of the distance image generated at step S2700 with a tracking-target template determined in advance. At the time point t1, the two-wheel vehicle is detected in the distance measurement range of the distance measurement device 100 for the first time, and thus the process proceeds to step S3100. At step S3100, the two-wheel vehicle is detected as a new target object in the distance image, and the process proceeds to step S3200. At step S3200, the two-wheel vehicle is set as a new tracking target object, and information of the target object is recorded in the storage medium 140. For example, data as illustrated in FIG. 6B may be recorded. At the time point t1, the previous position of the target object is unknown, and thus its position at the time point t2 cannot be estimated. Since no position is estimated, illumination used at the next time point t2 may be set based on, for example, the position and orientation of the target object at the time point t1. The orientation of the target object may be determined by, for example, image processing based on the distance image. In the example illustrated in FIG. 10A, an optical beam is used at the next time point t2, and the periphery of the position of the target object at the time point t1 is set as an optical-beam scanning range. After step S3200, the process returns to step S2100 and operation at the time point t2 is performed.

In the example illustrated in FIG. 10A, at the time point t2, no data is received from an adjacent distance measurement device at step S2100. Thus, the process proceeds to step S2200. Since the tracking target is set at step S3200 of processing at the time point t1, the process proceeds to step S2400. At step S2400, it is determined based on the data recorded at step S3200 at the time point t1 that optical-beam scanning is to be executed. At step S2500, the periphery of the position of the target object at the time point t1 is determined as a scanning range. At step S2700, the determined range is scanned with an optical beam to perform distance measurement in the range. At step S2800, matching is performed between the distance image of the scanning region, which is obtained at step S2400 and a matching template or model of a tracking target object stored in the storage medium 140. It is determined that the tracking target object is included in the distance image, and the process proceeds to step S2900. At step S2900, the processor 130 estimates the position of the target object at the time point t3 based on the moving amount of the target object between the time point t1 and the time point t2 and records information of the position in the storage medium 140. At the following step S3000, it is determined whether the position of the tracking target object, which is estimated at step S2900 is inside the visual field range of the distance measurement device 100. In the example illustrated in FIG. 10A, the position of the target object at the time point t3 is inside the visual field range of the distance measurement device 100, and thus the process proceeds to step S3200. At step S3200, the processor 130 performs tracking setting in accordance with the estimated position of the tracking target object at the time point t3, which is stored in the storage medium 140. In the example illustrated in FIG. 10A, the estimated position of the target object at the time point t3 is inside the flash-light distance measurement range of the distance measurement device 100, and thus flash light is set as illumination used at the time point t3. After step S3200, the process returns to step S2100, and operation at the time point t3 is performed.

At the time point t3 in the example illustrated in FIG. 10A, no data is received from an adjacent distance measurement device at step S2100. Thus, the process proceeds to step S2200. Since the tracking target is set at step S3200 of processing at the time point t1, the process proceeds to step S2400. At step S2400, it is determined based on the estimated position of the target object at the time point t3, which is estimated at the time point t2, to perform distance measurement by using flash light instead of beam scanning. At step S2600, the processor 130 generates a control signal for instructing distance measurement with flash light. At step S2700, the processor 130 causes the light emission device 110 and the light reception device 120 to execute distance measurement with flash light and acquires a distance image in a short-distance range of the entire visual field. At step S2800, matching is performed between the distance image obtained at step S2700 and a matching template or model of a tracking target object stored in the storage medium 140. In this example, it is determined by the matching that the tracking target object stored in the storage medium 140 is included in the distance image, and thus the process proceeds to step S2900. At step S2900, the processor 130 estimates the position of the target object at the next time point t4 (not illustrated) based on the moving amount of the target object between the time point t2 and the time point t3 and records information of the estimated position in the storage medium 140. At the following step S3000, it is determined whether the position of the tracking target object, which is estimated at step S2900 is inside the visual field range of the distance measurement device 100. Although no position is illustrated at the time point t4 in FIG. 10A, the target object 60 has passed through the visual field range of the distance measurement device 100 and is outside the visual field range at the time point t4. Thus, the process proceeds to step S3300. In the example illustrated in FIG. 10A, the visual field range of any non-illustrated adjacent distance measurement device is far away from the visual field range of the own the distance measurement device 100. Thus, at step S3300, it is determined that the estimated position of the target object at the time point t4 is not in the visual field of any adjacent distance measurement device, and the process proceeds to step S3600. At step S3600, the processor 130 cancels setting of the tracking target object stored in the storage medium 140, and the process returns to step S2100.

Figure 10B:
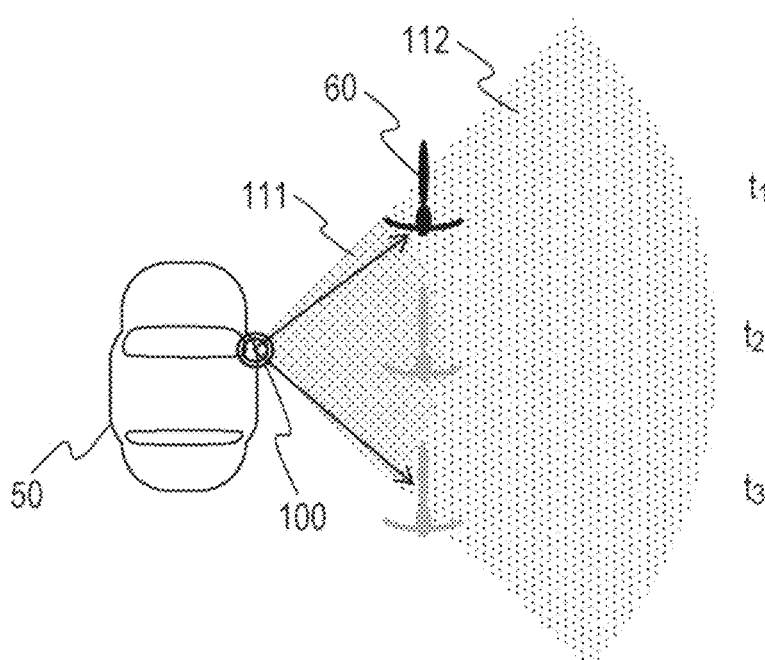
FIG. 10B is a diagram illustrating another exemplary situation in which a tracking target object moves in the visual field range of one distance measurement device.

FIG. 10B illustrates another exemplary situation in which the tracking target object 60 moves in the visual field range of one distance measurement device 100. In this example, the distance measurement device 100 is disposed at a side part of the moving object 50. The two-wheel vehicle as the target object 60 travels substantially in parallel to the traveling direction of the moving object 50 from a diagonally front side toward a diagonally back side of the moving object 50. At the time point t1, the target object 60 is inside the optical-beam distance measurement range 112. At the time point t2, the target object 60 enters the flash-light distance measurement range 111. At the time point t3, the target object 60 enters the optical-beam distance measurement range 112 again.

At the time point t1, similarly to the example illustrated in FIG. 10A, processing is performed in the order of steps S2100, S2200, S2300, S2700, S2800, S3100, and S3200. At step S3200, when information of the tracking target object is recorded in the storage medium 140, the process returns to step S2100 and processing at the time point t2 is performed.

At the time point t2, the process proceeds from step S2100 to step S2200, and since the tracking target object is set in the processing at the time point t1, the process proceeds to step S2400. In the example illustrated in FIG. 10B, when the position of the target object 60 at the time point t1 is extended, it is estimated that the target object 60 enters not the optical-beam distance measurement range 112 but the flash-light distance measurement range 111 at the time point t2. Thus, the negative determination is made at step S2400, and flash light is determined as illumination at step S2600. At the following step S2700, distance measurement with flash-light irradiation is performed, and the process proceeds to step S2800. The tracking target object is detected by the matching processing at step S2800, and thus the process proceeds to step S2900. At step S2900, the position of the target object 60 at the next time point t3 is estimated. At the following step S3000, it is determined that the target object 60 is inside the visual field range of the own the distance measurement device 100, and the process proceeds to step S3200. At step S3200, information of the tracking target object is recorded, and then the process returns to step S2100 and processing at the time point t3 is performed.

At the time point t3, similarly to the example illustrated in FIG. 10A, processing is performed in the order of steps S2100, S2200, and S2400. At step S2400, it is determined that beam scanning is to be executed, and the process proceeds to step S2500. After step S2500, steps S2700, S2800, and S2900 are executed. At step S2900, the position of the target object 60 at the non-illustrated time point t4 is estimated. The estimated position at the time point t4 is outside the visual field range of the distance measurement device 100, and thus the process proceeds to step S3300. Similarly to the example illustrated in FIG. 10A, the position of the target object 60 at the time point t4, which is estimated at step S2900 is outside the visual field range of any adjacent distance measurement device, and thus the process proceeds to step S3600. At step S3600, tracking setting is canceled, and then the process returns to step S2100.

Figure 10C:
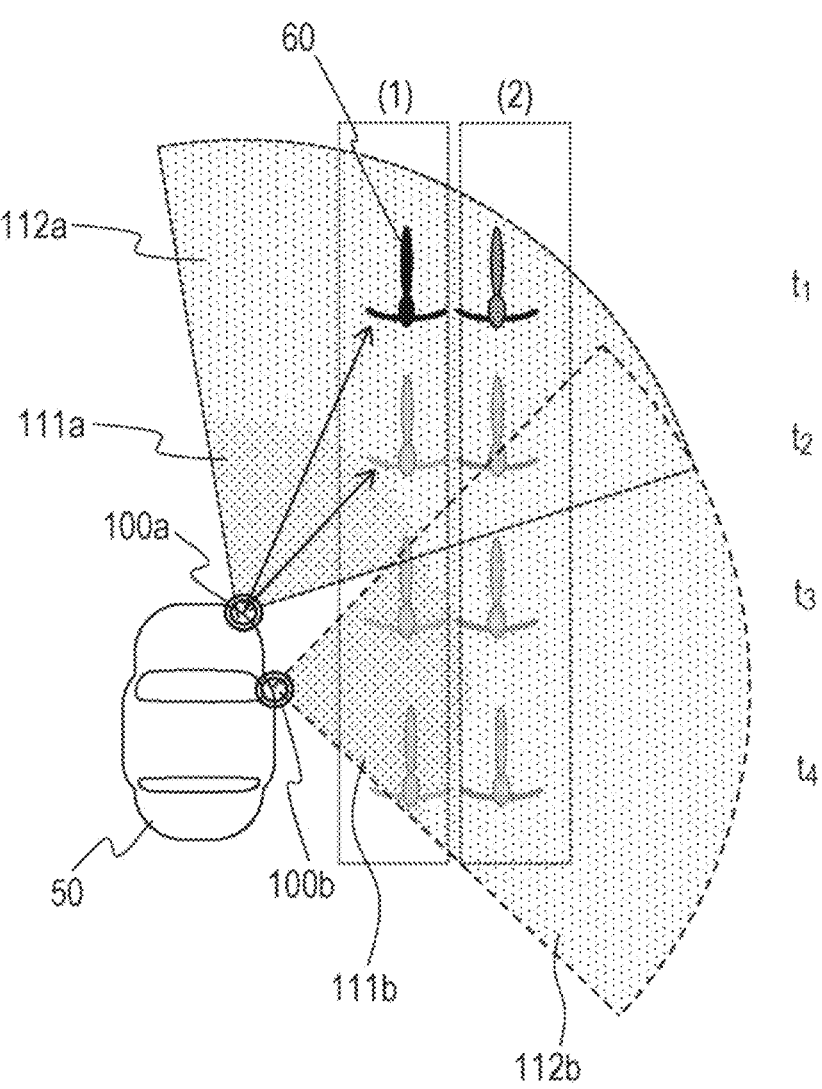
FIG. 10C is a diagram illustrating an exemplary situation in which tracking information is passed between two adjacent distance measurement devices.
Figure 10D:
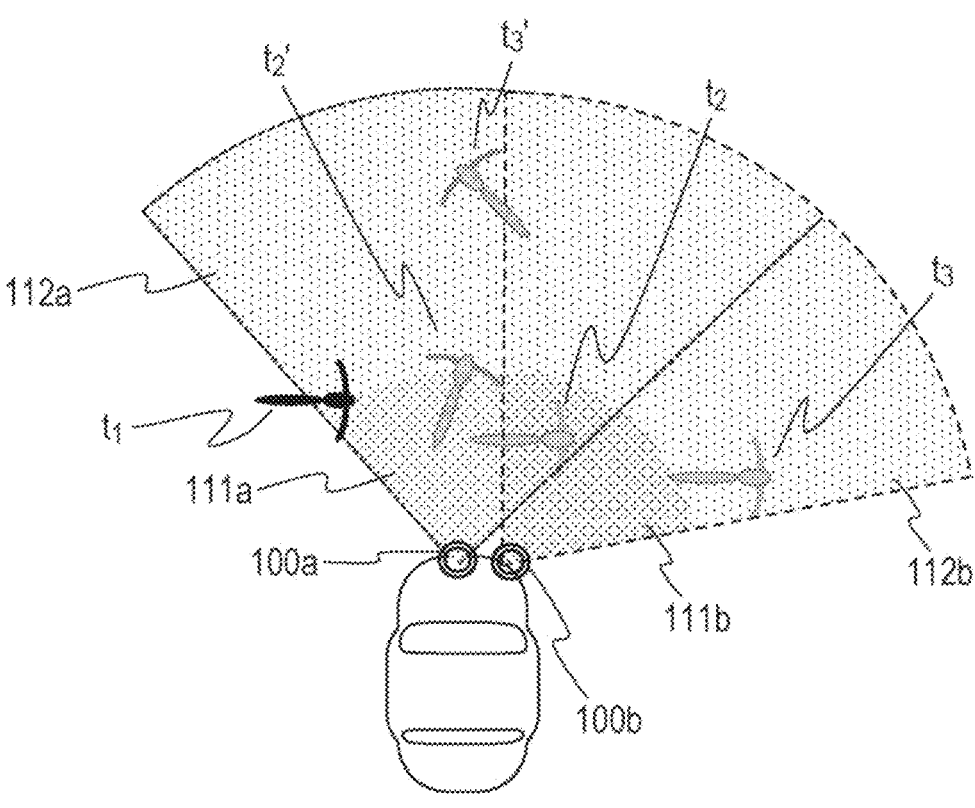
FIG. 10D is a diagram illustrating another exemplary situation in which tracking information is passed between two adjacent distance measurement devices.

The following describes, with reference to FIGS. 10C and 10D, exemplary operation in which tracking information of the target object is passed between two adjacent distance measurement devices 100a and 100b and tracking is continued.

FIG. 10C illustrates an exemplary situation in which tracking information is passed between the two adjacent distance measurement devices 100a and 100b. In the example illustrated in FIG. 10C, the first distance measurement device 100a is disposed at a right front part of the moving object 50, and the second distance measurement device 100b is disposed at a right side part of the moving object 50. (1) in FIG. 10C illustrates an example in which switching is performed between distance measurement using an optical beam and distance measurement using flash light. (2) in FIG. 10C illustrates an example in which tracking with distance measurement using an optical beam is continued by the distance measurement devices 100a and 100b. FIGS. 10C and 10D exemplarily illustrate distance measurement ranges 111a and 112a of the first distance measurement device 100a with flash light and an optical beam, respectively, and distance measurement ranges 111b and 112b of the second distance measurement device 100b with flash light and an optical beam, respectively. The following describes specific operation in the examples (1) and (2) in FIG. 10C with reference to FIG. 9.

In the example (1) in FIG. 10C, operation of the distance measurement device 100a at the time points t1 and t2 is the same as the operation at the time points t1 and t2 in the example illustrated in FIG. 10A. At the time point t1, the target object 60 enters the distance measurement range of the distance measurement device 100a for the first time, the negative determination is made at step S2100 since no data is received from the adjacent distance measurement device 100b, and the process proceeds to step S2200. At step S2200, tracking setting is yet to be performed, and thus the process proceeds to step S2300. At step S2300, a control signal for executing distance measurement by wide-range scanning is generated, and the process proceeds to step S2700. At step S2700, the light emission device 110 and the light reception device 120 perform distance measurement in the entire visual field range in accordance with the control signal. The processor 130 generates a distance image based on a detection signal output from the light reception device 120. At the following step S2800, the processor 130 performs matching between the target object in the distance image and the target object for which tracking is set. At this stage, no matching target object is set yet, and thus the process proceeds to step S3100. At step S3100, the tracking target object is extracted from the distance image generated at step S2700. In this example, the two-wheel vehicle is detected as a new target object, and the process proceeds to step S3200. At step S3200, the detected target object is provided with an ID, and information of the position of the target object at the time point t1 and information of illumination used for distance measurement at the next time point t2 in accordance with the position are recorded in a storage medium 140a. In this example, the target object 60 is inside the optical-beam distance measurement range 112a at the time points t1 and t2, and thus an optical beam is selected as illumination. Thereafter, the process returns to step S2100, and processing at the time point t2 is performed.

At the time point t1, the distance measurement device 100b has detected no target object and has received no data from the adjacent distance measurement device 100a. Thus, the distance measurement device 100b performs processing in the order of steps S2100, S2200, S2300, S2700, S2800, S3100, and S3600. Specifically, since the distance measurement device 100b has received no data from the adjacent distance measurement device 100a at step S2100, the process proceeds to step S2200. Since tracking has not been set yet, the process proceeds to step S2300 and wide-range scanning with an optical beam is selected. At step S2700, the distance measurement device 100b performs distance measurement by scanning the entire visual field range with an optical beam and acquires a distance image. At the time point t1, information of a target object for which tracking is set has not been recorded yet in a storage medium 140b of the distance measurement device 100b. Thus, no tracking target object is detected at step S2800, and the process proceeds to step S3100. At step S3100, matching with a target object template or model is performed. At the time point t1, no target object exists in the visual field range of the distance measurement device 100b, and thus the process proceeds to step S3600 and returns to step S2100. In this manner, at the time point t1, since the distance measurement device 100b has received no data from the adjacent distance measurement device 100a and no tracking target is set yet, distance measurement is performed in the entire visual field range. Since no target object is detected, tracking is not set and the process returns to step S2100. Thereafter, processing at the time point t2 is performed.

At the time point t2 in FIG. 10C, since the distance measurement device 100a has received no data from the adjacent distance measurement device 100b at step S2100, the process proceeds to step S2200. At the time point t2, information of the tracking target object detected at the previous time point t1 is recorded in the storage medium 140a, and thus the process proceeds to step S2400. Since an optical beam is stored as the kind of illumination in the storage medium 140a, the process proceeds to step S2500. At step S2500, a range to be irradiated with an optical beam is determined. In the storage medium 140a, the position of the target object at the time point t1 is stored but the position of the target object earlier than the time point t1 is not stored. Thus, the optical-beam irradiation range is set to be a relatively narrow range obtained through the position extension at the time point t1. At step S2700, the distance measurement device 100a performs distance measurement by emitting an optical beam in a direction set at step S2500 and scanning the set range and generates a distance image of a partial region of the visual field of the distance measurement device 100a. At the following step S2800, a tracking target object is detected from the distance image generated at step S2700 by matching and the process proceeds to step S2900. At step S2900, the processor 130 estimates, based on the position of the target object in a frame at the time point t1 and the position of the target object in a frame at the time point t2, the moving direction and moving amount of the target object between the frames, and estimates the position of the target object at the next time point t3. At the following step S3000, the processor 130 determines whether the position of the target object at the time point t3, which is estimated at step S2900 is inside the visual field of the distance measurement device 100a. In the example (1) in FIG. 10C, the estimated position of the target object at the time point t3 is outside the visual field of the distance measurement device 100a and is inside the flash-light irradiation range of the adjacent distance measurement device 100b. Thus, the process proceeds to steps S3000 to S3300 and S3400. At step S3400, flash light is set as illumination. At step S3500, the distance measurement device 100a transmits data including information of the target object and the illumination to the distance measurement device 100b. Thereafter, at step S3600, target object tracking setting stored in the storage medium 140a of the distance measurement device 100a is canceled, and the process returns to step S2100.

The operation of the distance measurement device 100b at the time point t2 is the same as the operation at the time point t1. At the time point t2, no data is received from the adjacent distance measurement device 100a and no target object exists in the visual field range of the distance measurement device 100b, and thus the process returns to step S2100 through steps S2100, S2200, S2300, S2700, S2800, S3100, and S3600.

The operation of the distance measurement device 100a at the time point t3 is the same as the operation of the distance measurement device 100b at the time points t1 and t2. Specifically, the process returns to step S2100 through steps S2100, S2200, S2300, S2700, S2800, S3100, and S3600.

At the time point t3, the distance measurement device 100b has received the data transmitted from the distance measurement device 100a at step S3500 at the time point t2. Thus, the positive determination is made at step S2100, and the process proceeds to step S2400. Since the data received from the distance measurement device 100a includes information that designates flash light, the process proceeds to step S2600 and flash light is set as illumination. At step S2700, the distance measurement device 100b performs distance measurement using flash light and generates a distance image. At the following step S2800, the distance measurement device 100b performs, based on the distance image, matching processing of a target object indicated by the data received from the distance measurement device 100a with a template or a model and detects the target object. At the following step S2900, the distance measurement device 100b estimates the position of the target object at the time point t4 based on information of the position of the target object at the time point t2, which is received from the distance measurement device 100a, and information of the position of the target object at the time point t3, which is detected by the own distance measurement device. The estimated position of the target object at the time point t4 is inside the visual field range of the distance measurement device 100b. Thus, the process proceeds to step S3200 to set tracking information and then returns to step S2100.

The operation of the distance measurement device 100a at the time point t4 is the same as the operation at the time point t3. Specifically, the process returns to step S2100 through steps S2100, S2200, S2300, S2700, S2800, S3100, and S3600.

At the time point t4, since the distance measurement device 100b has not received no data from the adjacent distance measurement device 100a at t3, the process proceeds from step S2100 to step S3000. Since tracking of the target object is set at step S3200 at the time point t3, the process proceeds to step S2400. In the example (1) in FIG. 10C, the estimated position of the target object at the time point t4 is inside the flash-light distance measurement range 111b, and thus the process proceeds to step S2600 to set flash-light irradiation and then proceeds to step S2700. At step S2700, the distance measurement device 100b performs distance measurement with flash light and generates a distance image. At the following step S2800, the target object is detected from the distance image by matching with reference to template data stored in the storage medium 140b. At step S2900, the position of the target object at the non-illustrated time point t5 is estimated. The estimated position of the target object at the time point t5 is outside the visual field range of the distance measurement device 100b. Thus, the process proceeds to step S3300. In the example illustrated in FIG. 10C, since the target object does not exist in the visual field of any distance measurement device at the time point t5, the process proceeds to step S3600. The processor 130 of the distance measurement device 100b cancels tracking setting stored in the storage medium 140b, and the process returns to step S2100.

The following describes operation of the distance measurement devices 100a and 100b in the example (2) in FIG. 10C.

The operation of the distance measurement device 100a at the time point t1 in the example (2) in FIG. 10C is the same as the operation of the distance measurement device 100a at the time point t1 in the example (1) in FIG. 10C. Specifically, the process returns to step S2100 through steps S2100, S2200, S2300, S2700, S2800, S3100, and S3200.

The operation of the distance measurement device 100a at the time point t2 is substantially the same as the operation of the distance measurement device 100a at the time point t2 in the example (1) in FIG. 10C. Specifically, the distance measurement device 100a executes the operation at steps S2100, S2200, S2400, S2500, S2500, S2700, S2800, S2900, S3000, S3300, S3400, S3500, and S3600. However, in this example, the estimated position of the target object at the time point t3 is inside the distance measurement range 112b of the adjacent distance measurement device 100b by optical-beam scanning. Thus, at step S3400, optical-beam scanning is selected. At step S3500, the distance measurement device 100a transmits, to the adjacent distance measurement device 100b, transmission data including information that designates optical-beam scanning. Thereafter, tracking setting is canceled at step S3600 and the process returns to step S2100.

The operation of the distance measurement device 100b at the time points t1 and t2 in the example (2) in FIG. 10C is the same as the operation of the distance measurement device 100b at the time points t1 and t2, respectively, in the example (1) in FIG. 10C, and thus description thereof is omitted.

The operation of the distance measurement device 100a at the time points t3 and t4 in the example (2) in FIG. 10C is the same as the operation of the distance measurement device 100a at the time points t3 and t4, respectively, in the example (1) in FIG. 10C, and thus description thereof is omitted.

The operation of the distance measurement device 100b at the time point t3 in the example (2) in FIG. 10C is substantially the same as the operation of the distance measurement device 100b at the time point t3 in the example (1) in FIG. 10C except that beam scanning is selected at step S2400. At the time point t3, since the distance measurement device 100b has received the data transmitted from the distance measurement device 100a at step S3500 at the time point t2, the process proceeds from step S2100 to step S2400. In this example, since the data received from the distance measurement device 100a includes information that designates optical-beam scanning, the process proceeds to step S2500. At step S2500, the distance measurement device 100b sets, as a scanning range, a range including the estimated position of the target object at the time point t3, which is received from the distance measurement device 100a. At the following step S2700, the distance measurement device 100b scans the peripheral region of the estimated position of the target object at the time point t3 with an optical beam and generates a distance image. At the following step S2800, the distance measurement device 100b performs, based on the distance image generated at step S2700, matching of a target object indicated by the data received from the distance measurement device 100a with a template or model and detects the target object. At the following step S2900, the distance measurement device 100b estimates the position of the target object at the time point t4 based on information of the position of the target object at the time point t2, which is received from the adjacent distance measurement device 100a, and information of the position of the target object at the time point t3, which is detected by the own distance measurement device. Since the estimated position of the target object at the time point t4 is inside the visual field range of the distance measurement device 100b, the process proceeds to step S3200 to set tracking information and returns to step S2100.

The operation of the distance measurement device 100b at the time point t4 in the example (2) in FIG. 10C is substantially the same as the operation of the distance measurement device 100b at the time point t4 in the example (1) in FIG. 10C except that beam scanning is selected at step S2400. At step S2100, since no data has been transmitted from the adjacent distance measurement device 100a at the time point t3, the process proceeds to step S2200. Since a tracking target is set at step S3200 at the time point t3, the process proceeds to step S2400. In the example (2) in FIG. 10C, the estimated position of the target object at the time point t4 is inside the visual field range of optical-beam scanning, and thus the process proceeds to step S2500. At step S2500, the distance measurement device 100b sets, as an optical-beam scanning range, the periphery of the estimated position of the target object at the time point t4, and the process proceeds to step S2700. At step S2700, the distance measurement device 100b generates a distance image of the optical-beam scanning region. At the following step S2800, the target object is detected from the distance image by matching with reference to template data stored in the storage medium 140b. At step S2900, the position of the target object at the non-illustrated time point t5 is estimated. The estimated position of the target object at the time point t5 is outside the visual field range of the distance measurement device 100b. Thus, the process proceeds to step S3300. In the example illustrated in FIG. 10C, since target object does not exist in the visual field of any distance measurement device at the time point t5, the process proceeds to step S3600. The processor 130 of the distance measurement device 100b cancels tracking setting stored in the storage medium 140b, and the process returns to step S2100.

The following describes operation in the example illustrated in FIG. 10D.

FIG. 10D illustrates another exemplary situation in which tracking information is passed between the two adjacent distance measurement devices 100a and 100b. In the example illustrated in FIG. 10D, the first distance measurement device 100a is disposed at the front center of the moving object 50, and the second the distance measurement device 100b is disposed on the front right side of the moving object 50. FIG. 10D illustrates an exemplary situation in which the two-wheel vehicle moves from left to right on the front side of the moving object 50 and turns left on the front side of the moving object 50.

The operation of the distance measurement device 100a at the time point t1 in the example illustrated in FIG. 10D is the same as the operation of the distance measurement device 100a at the time point t1 in each example illustrated in FIG. 10C. Specifically, at the time point t1, the target object enters the distance measurement range of the distance measurement device 100a for the first time, the negative determination is made at step S2100 since no data is received from the adjacent distance measurement device 100b, and the process proceeds to step S2200. At step S2200, since tracking setting is not performed yet, the process proceeds to step S2300. At step S2300, a control signal for executing distance measurement by wide-range scanning is generated, and the process proceeds to step S2700. At step S2700, the light emission device 110 and the light reception device 120 perform distance measurement in the entire visual field range in accordance with the control signal. The processor 130 generates a distance image based on a detection signal output from the light reception device 120. At the following step S2800, the processor 130 performs matching between the target object in the distance image and the target object for which tracking setting is performed. At this stage, no matching target object is set yet, and thus the process proceeds to step S3100. At step S3100, a tracking target object is extracted from the distance image generated at step S2700. In this example, the two-wheel vehicle is detected as a new target object, and the process proceeds to step S3200. At step S3200, the detected target object is provided with an ID, and information of the position of the target object at the time point t1 and information of illumination used for distance measurement at the next time point t2 in accordance with the position are recorded in the storage medium 140a. In the example illustrated in FIG. 10D, the target object is inside the optical-beam distance measurement range 112a at the time point t1, but it is estimated that the target object enters the flash-light distance measurement range 111a when moving the position at the time point t1 in the traveling direction of the target object. Thus, tracking setting with which flash light is set as illumination used at the next frame, in other words, at the time point t2 is performed at step S3200. Thereafter, the process returns to step S2100, and processing at the time point t2 is performed.

At the time point t1, the distance measurement device 100b has detected no target object and has received no data from the adjacent distance measurement device 100a. Thus, similarly to the operation at the time point t1 in the example illustrated in FIG. 10C, the distance measurement device 100b performs processing in the order of steps S2100, S2200, S2300, S2700, S2800, S3100, and S3600.

At the time point t2, since the distance measurement device 100a has received no data from the adjacent distance measurement device 100b at step S2100, the process proceeds to step S2200. At the time point t2, information of the tracking target object detected at the previous time point t1 is recorded in the storage medium 140a, and thus the process proceeds to step S2400. Since flash light is stored as the kind of illumination in the storage medium 140a, the process proceeds to step S2600. At step S2600, flash light is set as illumination. At step S2700, the distance measurement device 100a performs distance measurement with flash light and generates a distance image. At the following step S2800, the target object set as a tracking target is detected from the distance image generated at step S2700 by matching with a template, and the process proceeds to step S2900. At step S2900, the processor 130 estimates, based on the position of the target object in the frame at the time point t1 and the position of the target object in the frame at the time point t2, the moving direction and moving amount of the target object between the frames and estimates the position of the target object at the next time point t3. At the following step S3000, the processor 130 determines whether the position of the target object at the time point t3, which is estimated at step S2900 is inside the visual field of the distance measurement device 100a. In the example illustrated in FIG. 10D, the estimated position of the target object at the time point t3 is outside the visual field of the distance measurement device 100a and is inside the optical-beam distance measurement range 112b of the adjacent distance measurement device 100b. Thus, the process proceeds to steps S3000 to S3300 and S3400. At step S3400, an optical beam is set as illumination. At step S3500, the distance measurement device 100a transmits data including information of the target object and the illumination to the distance measurement device 100b. Thereafter, at step S3600, target object tracking setting stored in the storage medium 140a of the distance measurement device 100a is canceled, and the process returns to step S2100.

At the time point t2, since the distance measurement device 100b has received no data from the adjacent distance measurement device 100a at step S2100, the process proceeds to step S2200. At step S2200, since tracking setting is not performed yet, the process proceeds to step S2300. At step S2300, a control signal for executing distance measurement by wide-range scanning is generated, and the process proceeds to step S2700. At step S2700, the light emission device 110 and the light reception device 120 performs distance measurement in the entire visual field range in accordance with the control signal. The processor 130 generates a distance image based on a detection signal output from the light reception device 120. At the following step S2800, the processor 130 performs matching between the target object in the distance image and the target object for which tracking setting is performed. At this stage, no matching target object is set yet, and thus the process proceeds to step S3100. At step S3100, a new target object is detected from the distance image generated at step S2700 by matching with a target object template or model determined in advance. In the example illustrated in FIG. 10D, the two-wheel vehicle is detected as a new target object, and the process proceeds to step S3200. At step S3200, the detected target object is provided with an ID, and information of the position of the target object at the time point t2 and information of illumination used for distance measurement at the next time point t3 in accordance with the position are recorded in the storage medium 140a. In the example illustrated in FIG. 10D, consideration of the traveling direction of the target object from the position at the time point t1 to the position at the time point t2 estimates that the target object enters the optical-beam distance measurement range 112*b* at the time point t3. Thus, tracking setting with which an optical beam is set as illumination to be used in the next frame, in other words, at the time point t3 is performed at step S3200. Thereafter, the process returns to step S2100 and processing at the time point t3 is performed.

The operation of the distance measurement device 100*a* at the time point t3 is the same as the operation at the time points t3 and t4 in each example illustrated in FIG. 10C. At step S2100, since no data is received from the adjacent distance measurement device 100*b*, the process proceeds to step S2200. Since tracking setting is canceled at t2, the process proceeds to step S2300. Thereafter, the process proceeds from step S2700 to step S2800. At step S2800, since there is no tracking target object to be matched, the process proceeds to step S3100. In the example illustrated in FIG. 10D, no new target object exists in the visual field range of the distance measurement device 100*a* at the time point t3, and thus the process proceeds to step S3600 and returns to step S2100.

At the time point t3, the distance measurement device 100*b* has received the data transmitted from the distance measurement device 100*a* at step S3500 at the time point t2. Thus, the positive determination is made at step S2100, and the process proceeds to step S2400. Since the data received from the distance measurement device 100*a* includes information that designates optical-beam scanning, the process proceeds to step S2500 and a scanning range is set. Note that, in this example, information of illumination used at the time point t3 is included not only in the data received from the adjacent distance measurement device 100*a* but also in the tracking data generated by the distance measurement device 100*b* at step S3200 at the previous time point t2. In such a case, the illumination information included in the data received from the adjacent distance measurement device 100*a* is prioritized and the illumination information generated by the own distance measurement device is discarded. At the following step S2700, the distance measurement device 100*b* performs distance measurement by beam scanning in the periphery of the estimated position of the target object and generates a distance image of the scanning region. At the following step S2800, the distance measurement device 100*b* performs matching of the target object indicated by the data received from the distance measurement device 100*a* with a template based on the distance image and detects the target object. At the following step S2900, the distance measurement device 100*b* estimates the position of the target object at the non-illustrated time point t4 based on the position of the target object at the time point t2 in the tracking data and the position of the target object at the time point t3, which is specified based on the distance image. At step S3000, it is determined whether the position of the target object, which is estimated at step S2900 is inside the visual field range of the distance measurement device 100*b*. In the example illustrated in FIG. 10D, when linearly estimated based on the position at the time point t2 and the position at the time point t3, the position of the target object at the time point t4 is outside the visual field range of the distance measurement device 100*b*. Thus, the process proceeds to step S3300. In the example illustrated in FIG. 10D, the position of the target object at the time point t4 is not in the visual field range of any adjacent distance measurement device, and thus the process proceeds to step S3600. At step S3600, tracking setting is canceled, and the process returns to step S2100.

In the example illustrated in FIG. 10D, the two adjacent distance measurement devices 100*a* and 100*b* are close to each other and the flash-light visual field ranges thereof largely overlap each other. At the time point t2, the distance measurement devices 100*a* and 100*b* both perform distance measurement of the same target object in accordance with FIG. 9. However, at the time point t3, the distance measurement device 100*b* performs distance measurement of the target object in accordance with tracking information transmitted from the distance measurement device 100*a* in accordance with FIG. 9. The distance measurement device 100*b* detects the target object from the distance image of a relatively narrow region obtained by beam scanning in a narrowed range. With such operation, processing is efficiently performed.

When processing is performed in accordance with FIG. 9, the distance measurement operation of the distance measurement devices 100*a* and 100*b* at the time point t2 is independently performed. To further improve the efficiency, tracking information of a target object in a common flash-light visual field range of the distance measurement devices 100*a* and 100*b* may be shared when overlapping of the visual field ranges is large as in the example illustrated in FIG. 10D, for example. The following describes an example of such operation with reference to FIG. 11.

Figure 11:
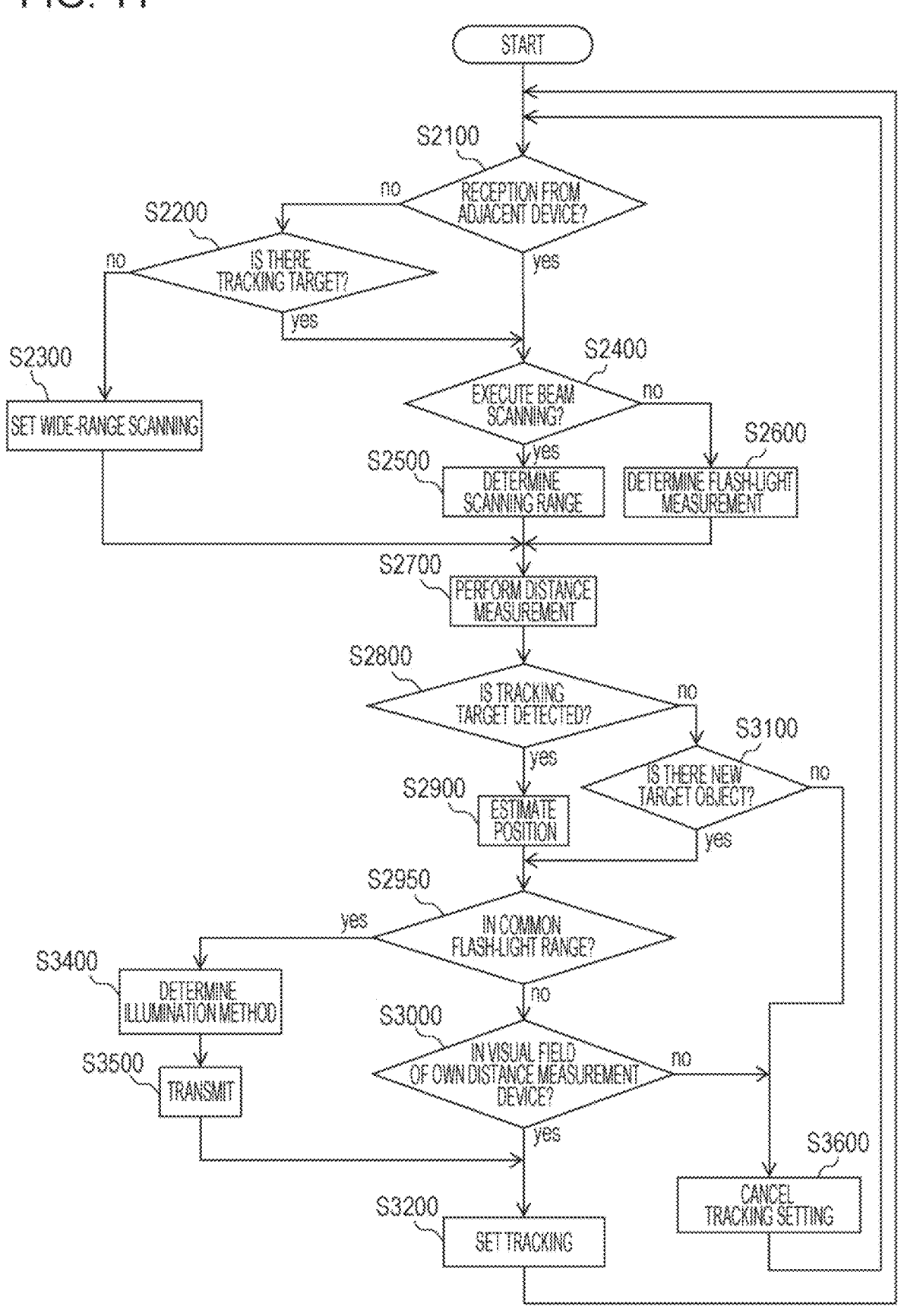
FIG. 11 is a flowchart illustrating other exemplary operation of each distance measurement device.

FIG. 11 is a flowchart illustrating operation of each distance measurement device 100 when tracking information of a target object existing in the common flash-light visual field range is shared. Operation at steps S2100 to S2900 or S3100 in FIG. 11 is the same as the operation at the corresponding steps illustrated in FIG. 9. In the example illustrated in FIG. 11, operation at step S2950 is executed after steps S2900 and S3100.

The following first describes the operation of the distance measurement device 100*a* at the time point t1 in the example illustrated in FIG. 10D. Similarly to the example illustrated in FIG. 9, the distance measurement device 100*a* executes operation at steps S2100, S2200, S2300, S2700, S2800, and S3100. At step S3100, the target object is detected, and the process proceeds to step S2950. At step S2950, the processor 130 determines whether the estimated position of the target object at the time point t2 is inside a range in which the flash-light distance measurement range 111*a* of the own the distance measurement device 100*a* and the flash-light distance measurement range 111*b* of the adjacent distance measurement device 100*b* overlap each other. At the time point t1, since the distance measurement device 100*a* detects the target object for the first time, the position of the target object at the time point t2 is set in a range to which the position at the time point t1 is extended. In the example illustrated in FIG. 10D, the range to which the position at the time point t1 is extended is inside the flash-light visual field range of the distance measurement device 100*a*. Thus, the positive determination is made at step S2950, and the process proceeds to step S3400. At step S3400, the distance measurement device 100*a* sets flash light as the kind of illumination to be used at the time point t2. At the following step S3500, the distance measurement device 100*a* transmits tracking data including information related to the target object and the illumination to the adjacent distance measurement device 100*b*. In addition, at step S3200, the distance measurement device 100*a* sets tracking information for performing tracking at the own distance measurement device and stores the tracking information in the storage medium 140*a*. Through the operation at steps S3500 and S3200, the tracking information is shared by the distance measurement devices 100*a* and 100*b*. After step S3200, the process returns to step S2100.

The operation of the distance measurement device 100*b* at the time point t1 is the same as the operation in FIG. 9. Specifically, processing is performed in the order of steps S2100, S2200, S2300, S2700, S2800, S3100, and S3600, and the process returns to step S2100.

The operation of the distance measurement device 100*a* at the time point t2 is the same as the example illustrated in FIG. 9. Specifically, processing is performed in the order of steps S2100, S2200, S2400, S2600, S2700, S2800, and S2900. At step S2900, the distance measurement device 100*a* estimates the position of the target object at the time point t3. The distance measurement device 100*a* estimates the position of the target object at the time point t3 based on positions at the time points t1 and t2. The estimated position of the target object at the time point t3 is outside the flash-light visual field range of the distance measurement device 100*a*, and thus the negative determination is made at step S2950 and the process proceeds to step S3000. At step S3000, the estimated position of the target object at the time point t3 is outside the entire visual field range of the distance measurement device 100*a* including the scanning range, and thus the process proceeds to step S3600. At step S3600, the distance measurement device 100*a* cancels tracking setting. Specifically, tracking information related to the target object and recorded in the storage medium 140*a* is deleted. Thereafter, the process returns to step S2100.

At the time point t2, the distance measurement device 100*b* has received shared tracking information from the adjacent distance measurement device 100*a*, and thus the positive determination is made at step S2100 and the process proceeds to step S2400. The shared tracking information transmitted from the distance measurement device 100*a* indicates that the target object is inside the flash-light visual field range, and thus the process proceeds to step S2600. At step S2600, flash light is set as illumination. At step S2700, the distance measurement device 100*b* performs distance measurement by irradiation with flash light and generates a distance image. At step S2800, the distance measurement device 100*b* performs matching of the target object indicated by the shared tracking information transmitted from the distance measurement device 100*a* with a template based on the distance image and detects the tracking target object. At step S2900, the distance measurement device 100*b* estimates a position at the time point t3 based on position information at the time point t1 and position information at the time point t2, which are included in the shared tracking information. At step S2950, it is determined that the position of the target object at the time point t3, which is estimated at step S2900 is outside the flash-light visual field range of the distance measurement device 100*b*, and the process proceeds to step S3000. At step S3000, it is determined that the position of the target object at the time point t3, which is estimated at step S2900 is inside the scanning visual field range of the distance measurement device 100*b*, and the process proceeds to step S3200. At step S3200, the distance measurement device 100*b* records information related to the position of the target object at the time point t3 and the used illumination in the storage medium 140 and updates tracking information. Thereafter, the process returns to step S2100.

In this example, the estimated position of the target object at the time point t3 is outside the flash-light visual field ranges of the distance measurement devices 100*a* and 100*b*. Thus, the distance measurement devices 100*a* and 100*b* both do not perform data transmission for tracking information sharing.

At the time point t3, the distance measurement device 100*a* performs the same operation as in the example illustrated in FIG. 9. In this case, no shared information has been received from the adjacent distance measurement device 100*b* and tracking setting is canceled at t2. Thus, processing is performed in the order of steps S2100, S2200, S2300, S2700, S2800, and S3100. At step S3100, no new target object is detected, and thus the process proceeds to step S3600 and returns to step S2100.

At the time point t3, the distance measurement device 100*b* has received no shared information transmitted from the adjacent distance measurement device 100*a* at the previous time point t2, and thus the process proceeds from step S2100 to step S2200. Tracking information indicating that the estimated position of the target object at the time point t3 is inside a scanning range is recorded in the storage medium 140 of the distance measurement device 100*b*. Thus, the process proceeds to step S2400, and beam scanning is selected. At the following step S2500, a scanning range is set. At step S2700, distance measurement by beam scanning is performed, and a distance image of the scanning range is generated. At step S2800, the tracking target object is detected from the distance image of the scanning range, which is acquired at step S2700, and the process proceeds to step S2900. At step S2900, the position of the target object at the non-illustrated next time point t4 is estimated based on the position of the target object at the time point t2 and the position of the target object at the time point t3. The estimated position of the target object at the time point t4 is outside the flash-light visual field ranges of the distance measurement device 100*b* and the distance measurement device 100*a*. Thus, the negative determination is made at step S2950, and the process proceeds to step S3000. At step S3000, it is determined that the estimated position of the target object at the time point t4 is outside the entire visual field range of the distance measurement device 100*b* including the scanning range, and the process proceeds to step S3600. At step S3600, tracking setting is canceled, and the process returns to step S2100.

The following describes other exemplary operation when the distance measurement device 100*a* detects the target object at a position denoted by t2' in FIG. 10D at the time point t2. In this case, at step S2900, the distance measurement device 100*a* estimates the position of the target object at the time point t3 to be a position denoted by t3' in FIG. 10D based on the position of the target object and orientation at the time points t1 and t2. This position is outside the flash-light visual field range of the distance measurement devices 100*a* and 100*b*, and thus the process proceeds to step S3000. At step S3000, it is determined that the position denoted by t3' is inside the beam-scanning range of the distance measurement device 100*a*, and the process proceeds to step S3200. In this case, the operation at steps S3400 and S3500 is not performed, and thus no tracking information is transmitted to the adjacent distance measurement device 100*b*. At step S3200, tracking information at the distance measurement device 100*a* is updated, and the process returns to step S2100. Thereafter, the distance measurement device 100*a* continues tracking of the target object.

At the time point t2, the operation of the distance measurement device 100*b* when the target object is at the position denoted by t2' illustrated in FIG. 10D is the same as the operation of the distance measurement device 100*b* at the time point t1. Specifically, processing is performed in the order of steps S2100, S2200, S2300, S2700, S2800, S3100, and S3600, and the process returns to step S2100.

At the time point t3, when the target object exists at the position denoted by t3' in FIG. 10D, the distance measurement device 100*a* determines that there is no reception from the adjacent distance measurement device 100*b* at step S2100, and the process proceeds to step S2200. At step S2200, information of a tracking target is stored in the storage medium 140*a*, and thus the process proceeds to step S2400. At step S2400, it is determined that beam scanning is to be executed, and the process proceeds to step S2500. At step S2500, the distance measurement device 100*b* determines the direction of optical-beam scanning. At step S2700, the distance measurement device 100*b* acquires a distance image of a region corresponding to a scanning range. At step S2800, the tracking target object is detected in the distance image acquired at step S2700, and the process proceeds to step S2900. At step S2900, the distance measurement device 100*b* estimates the position of the target object at the non-illustrated time point t4 based on the position of the target object at the time point t2 and orientation and the position of the target object at the time point t3 and orientation. At the following step S2950, the distance measurement device 100*a* determines whether the estimated position of the target object at the time point t4, which is estimated at step S2900 is inside the common flash-light visual field range of the distance measurement devices 100*a* and 100*b*. In this example, the estimated position of the target object at the time point t4 is outside the common flash-light visual field range of the distance measurement devices 100*a* and 100*b*, and thus the process proceeds to step S3000. The estimated position of the target object at the time point t4 is outside the entire visual field range of the distance measurement device 100*a* including the scanning visual field range, and thus the process proceeds to step S3600. At step S3600, the distance measurement device 100*a* cancels tracking target setting, and the process returns to step S2100.

At the time point t3, the operation of the distance measurement device 100*b* when the target object is at the position denoted by t3' illustrated in FIG. 10D is the same as the operation of the distance measurement device 100*b* at the time points t1 and t2. Specifically, processing is performed in the order of steps S2100, S2200, S2300, S2700, S2800, S3100, and S3600, and the process returns to step S2100.

As described above, in the example illustrated in FIG. 11, the two adjacent distance measurement devices 100*a* and 100*b* share information of the target object existing in an overlapping part of the visual field. The distance measurement devices 100*a* and 100*b* can each have past position information of the target object detected by the own distance measurement device for the first time. Thus, the position of the target object can be estimated at higher accuracy, and more efficient distance measurement with a narrowed light irradiation range can be performed. The kind and direction of illumination can be appropriately selected in accordance with the estimated position of the target object, and thus tracking of the target object across a plurality of distance measurement devices can be efficiently performed.

As described above, according to the present embodiment, information necessary for tracking of a target object is transmitted and received among a plurality of distance measurement devices 100 having distance measurement ranges that are adjacent to each other or partially overlap each other. Thus, the target object can be efficiently tracked without setting tracking information related to the same target object for each distance measurement device 100. In particular, in a case of wide-range scanning with an optical beam as in conventional cases, time is needed until the target object is detected. However, in the present embodiment, the range of optical-beam scanning can be narrowed in accordance with a measured position or estimated position of the target object by transmitting and receiving tracking information among the plurality of distance measurement devices 100. As a result, it is possible to swiftly detect a target object having entered in the visual field of each distance measurement device 100 for the first time.

Embodiment 2

The following describes a second embodiment of the present disclosure.

In Embodiment 1, data related to a target object and illumination is transmitted and received among the plurality of distance measurement devices 100 included in the distance measurement system 10. Each distance measurement device 100 transmits data indicating a distance measurement result to the processing device 300. However, in Embodiment 2, each distance measurement device 100 transmits, in addition to data indicating a distance measurement result, data related to the target object and illumination to the processing device 300. The processing device 300 integrates, based on information of the position and orientation of each distance measurement device 100, the transmitted distance measurement data as data expressed in a common coordinate system. In addition, the processing device 300 estimates the position of the target object at the next distance measurement time after being subjected to distance measurement by each distance measurement device 100, and transmits data related to illumination to another distance measurement device 100 that can perform distance measurement of the target object. Accordingly, the target object moving across the distance measurement ranges of the plurality of distance measurement devices 100 can be efficiently tracked.

Figure 12:
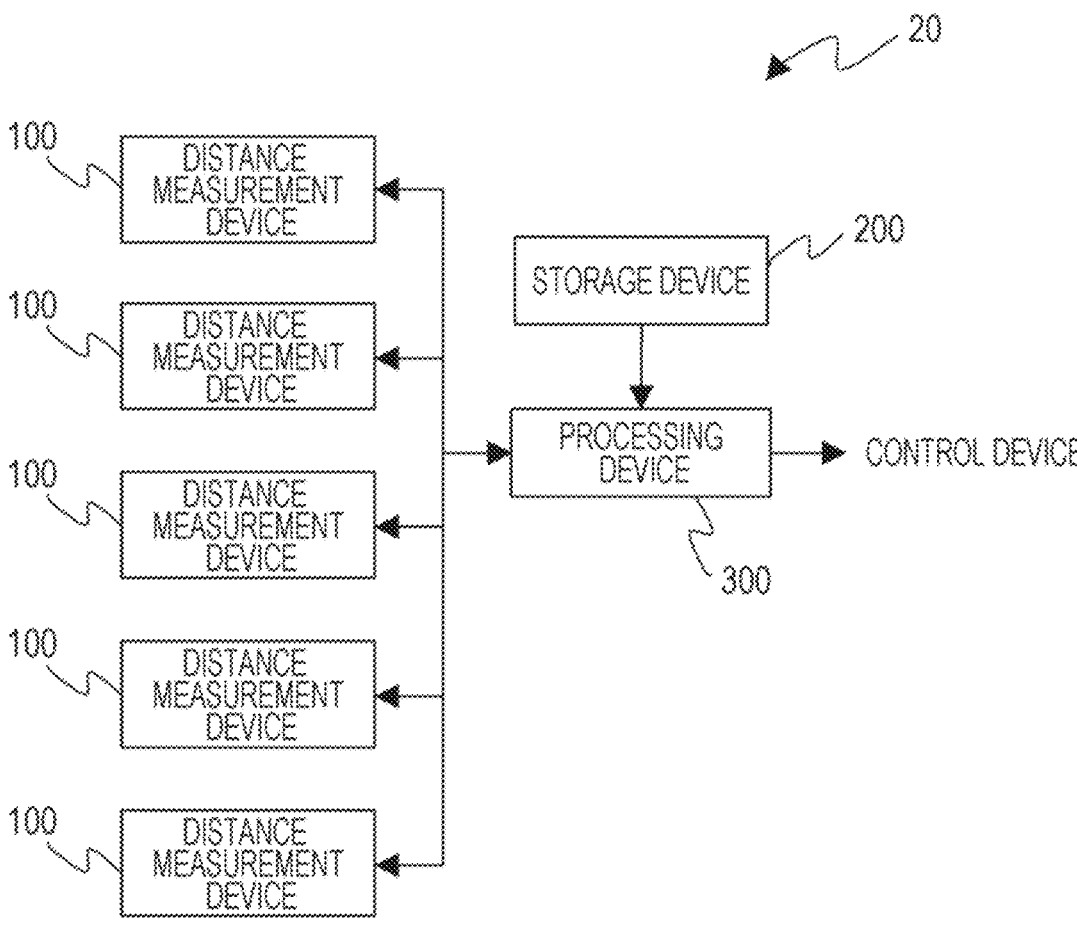
FIG. 12 is a block diagram illustrating the configuration of a distance measurement system in Embodiment 2.

FIG. 12 is a block diagram illustrating the configuration of a distance measurement system 20 in Embodiment 2. In the present embodiment, each distance measurement device 100 does not directly communicate with another distance measurement device 100 but performs data transmission and reception through the processing device 300. Each distance measurement device 100 is connected to the processing device 300 in a wireless or wired manner and can transmit and receive data to and from the processing device 300. In the present embodiment, the storage device 200 stores, in addition to the data illustrated in FIG. 7, data indicating the flash-light and optical-beam distance measurement ranges of each distance measurement device 100. The data indicating the distance measurement ranges is expressed in a common coordinate system set to the distance measurement system 20.

Figure 13:
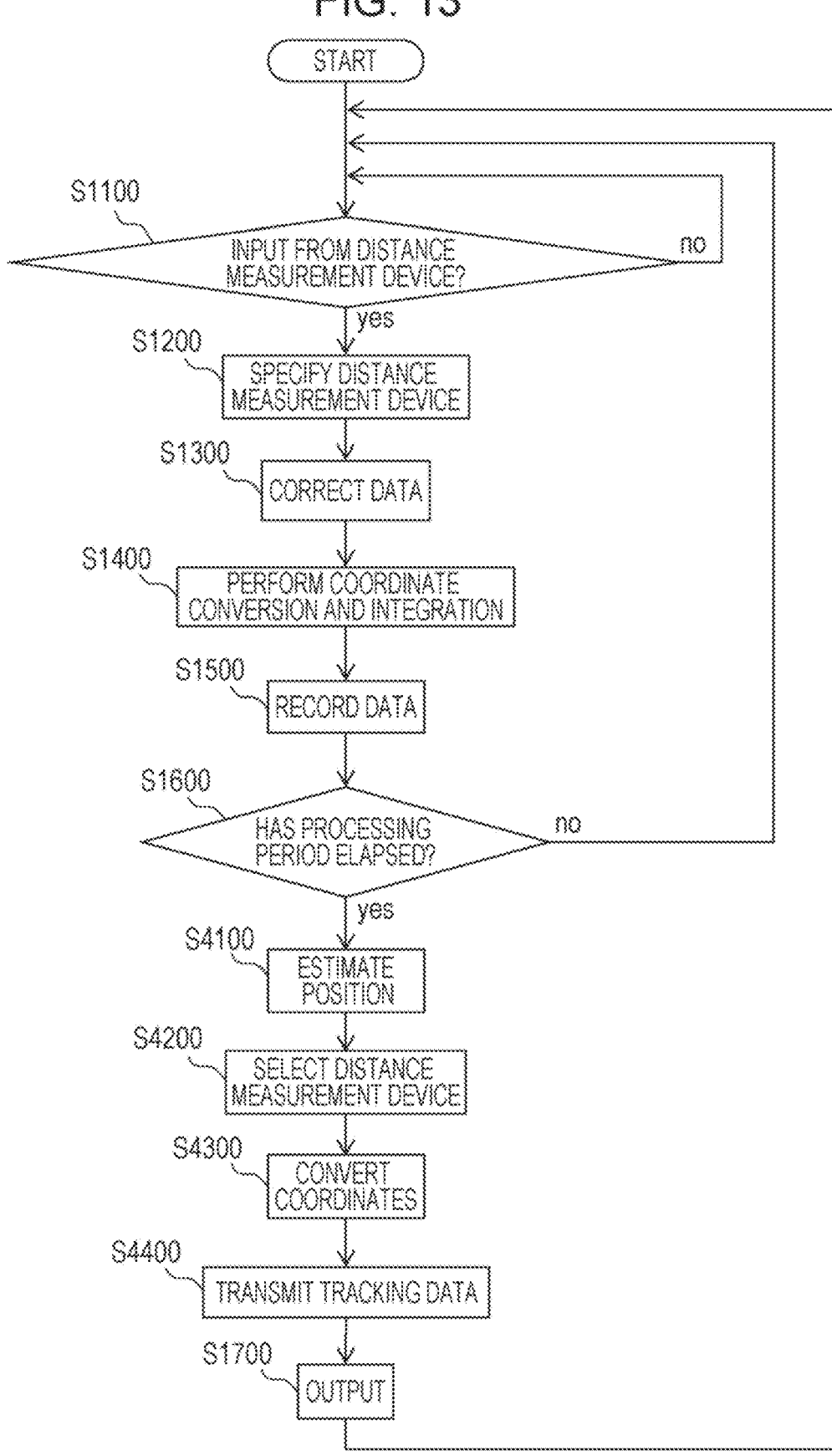
FIG. 13 is a flowchart illustrating exemplary operation of a processing device in Embodiment 2.

FIG. 13 is a flowchart illustrating operation of the processing device 300 in Embodiment 2. The same operation as operation of the processing device 300 (refer to FIG. 8) in Embodiment 1 is denoted by the same reference sign, and description thereof is omitted. Operation at steps S1100 to S1600 and S1700 is the same as operation illustrated in FIG. 8. In the present embodiment, operation at steps S4100 to S4400 is added between steps S1600 and S1700. The following describes the operation at steps S4100 to S4400.

(Step S4100)

The processing device 300 estimates the position of the target object at the next distance measurement based on position data of the target object, which is recorded at step S1500 and position data of the same target object, which is recorded at the previous distance measurement. The position estimation may be performed by, for example, calculating a movement vector of the target object. The processing device 300 calculates the movement vector based on difference in the position of the target object between two consecutive times of distance measurement. The position of the target object at the next distance measurement can be estimated by doubling the magnitude of the calculated movement vector. (Step S4200)

The processing device 300 refers to data of the distance measurement range of each distance measurement device 100, which is recorded in the storage device 200, and selects one or more distance measurement devices 100 that can perform distance measurement of the target object at the position estimated at step S4100. (Step S4300)

The processing device 300 refers to the coordinates and orientation of each distance measurement device 100 selected at step S4200, which are recorded in the storage device 200, and converts the coordinate values of the estimated position of the target object into coordinate values in the coordinate system of the distance measurement device 100. Then, the processing device 300 refers to data in the storage device 200 and determines the kind of illumination and the direction of irradiation of each distance measurement device 100 suitable for distance measurement of the target object. (Step S4400)

The processing device 300 transmits, to each distance measurement device 100 selected at step S4200, tracking data including information of the kind of illumination and the direction of irradiation, which are determined at step S4300 and information of a template or the like indicating the shape of the target object. The tracking data may be transmitted, for example, in the same format as the data illustrated in FIG. 6C.

Through the above-described operation, the target object moving across the visual field ranges of the plurality of distance measurement devices 100 can be efficiently tracked as the same single target object without initialization at each handover between distance measurement devices 100 that perform distance measurement.

Note that the processing device 300 may be configured to simply relay tracking data transmitted from each distance measurement device 100 to another distance measurement device 100 instead of performing the operation at steps S4100 to S4400. In this case, a distance measurement device 100 at the transmission source or a distance measurement device 100 at the transmission destination performs necessary coordinate transform and determines the kind of illumination and the direction of irradiation that are suitable for target object distance measurement.

In the above-described embodiments, each distance measurement device 100 can switch emission of an optical beam and emission of flash light but may have no function to emit flash light. In this case, the operation of determining the kind of illumination is omitted, and no information indicating the kind of illumination is included in recorded and transmitted data. Each distance measurement device 100 may have a function to change the spread angle of the optical beam. With such a configuration, the spread angle of the optical beam can be adaptively changed in accordance with target object size or distance.

The technology of the present disclosure is widely applicable to a system including a plurality of distance measurement devices. For example, the technology of the present disclosure is useful for a distance measurement system mounted on a moving object that performs automated driving.

What is claimed is:

1. A distance measurement device in a system including two or more distance measurement devices having distance measurement ranges that are adjacent to each other or partially overlap each other, the distance measurement device comprising:

a light emission device configured to change an irradiation range of light;

a light reception device which detects reflected light generated from the light emitted from the light emission device when reflected at a target object and outputs a detection signal; and a processing circuit having a function to communicate with another distance measurement device in the system and which determines the position of the target object by calculating the distance to the target object based on the detection signal, wherein the processing circuit generates, based on the determined position of the target object, first setting data for defining an irradiation range of light to be emitted from the other distance measurement device and transmits the first setting data to the other distance measurement device, and controls light emission from the light emission device in accordance with second setting data for defining an irradiation range of light to be emitted from the light emission device, when having received the second setting data from the other distance measurement device.

2. The distance measurement device according to claim 1, wherein the light emission device is configured to change a spread angle of emitted light, and the second setting data defines a spread angle of light to be emitted from the light emission device.

3. The distance measurement device according to claim 1, wherein the first setting data defines a spread angle of light to be emitted from the other distance measurement device.

4. The distance measurement device according to claim 1, wherein the first setting data includes information indicating the position of the target object the distance to which is calculated by the processing circuit.

5. The distance measurement device according to claim 1, wherein the second setting data includes information indicating the position of a distance measurement target object, and the processing circuit controls light emission from the light emission device so that the distance measurement target object is irradiated with light.

6. The distance measurement device according to claim 1, wherein the light emission device is configured to switch between emission of an optical beam and emission of diffused light and is configured to change the direction of the optical beam, the second setting data includes information indicating whether light to be emitted from the light emission device is the optical beam or the diffused light, and information defining the direction of the optical beam when light to be emitted from the light emission device is the optical beam, and the processing circuit causes, in accordance with the second setting data, the light emission device to emit the diffused light or emit the optical beam in the defined direction.

7. The distance measurement device according to claim 1, wherein the first setting data includes information indicating whether light to be emitted from the other distance measurement device is an optical beam or diffused light, and information defining the direction of the optical beam when light to be emitted from the other distance measurement device is the optical beam.

8. The distance measurement device according to claim 1, wherein, when having determined that the target object enters the distance measurement range of the other distance measurement device based on data defining the distance measurement range of the other distance measurement device and based on temporal change of the determined position of the target object, the processing circuit generates the first setting data and transmits the first setting data to the other distance measurement device.

9. The distance measurement device according to claim 1, wherein the distance measurement range of the other distance measurement device includes a first range of distance measurement with an optical beam and a second range of distance measurement with diffused light, and the processing circuit determines whether the target object enters the first range or the second range based on data defining the first range and the second range and based on temporal change of the determined position of the target object, when having determined that the target object enters the first range, generates the first setting data including information indicating that light to be emitted from the other distance measurement device is an optical beam and information defining the direction of the optical beam and transmits the first setting data to the other distance measurement device, and when having determined that the target object enters the second range, generates the first setting data including information indicating that light to be emitted from the other distance measurement device is diffused light and transmits the first setting data to the other distance measurement device.

10. The distance measurement device according to claim 1, wherein the processing circuit periodically executes an operation that causes the light emission device to emit light and the light reception device to output the detection signal, and when having predicted that the position of the target object determined based on the detection signal enters the distance measurement range of the other distance measurement device in the next period, the processing circuit generates the first setting data and transmits the first setting data to the other distance measurement device.

11. The distance measurement device according to claim 1, wherein the processing circuit transmits the first setting data to the other distance measurement device through a processing device included in the system, and receives the second setting data from the other distance measurement device through the processing device.

12. A system including two or more distance measurement devices having distance measurement ranges that are adjacent to each other or partially overlap each other, wherein each of the two or more distance measurement devices includes a light emission device configured to change an irradiation range of light, a light reception device which detects reflected light generated from the light emitted from the light emission device when reflected at a target object and outputs a detection signal, and a processing circuit having a function to communicate with another distance measurement device in the system and which determines the position of the target object by calculating the distance to the target object based on the detection signal, and the processing circuit generates, based on the determined position of the target object, first setting data for defining an irradiation range of light to be emitted from the other distance measurement device and transmits the first setting data to the other distance measurement device, and controls light emission from the light emission device in accordance with second setting data for defining an irradiation range of light to be emitted from the light emission device, when having received the second setting data from the other distance measurement device.

13. A method executed by a computer of a distance measurement device in a system including two or more distance measurement devices having distance measurement ranges that are adjacent to each other or partially overlap each other, the method comprising:

causing a light emission device to emit light, the light emission device being configured to change an irradiation range of the light;

causing a light reception device to detect reflected light generated from the light emitted from the light emission device when reflected at a target object and to output a detection signal;

determining the position of the target object by calculating the distance to the target object based on the detection signal;

generating, based on the determined position of the target object, first setting data for defining an irradiation range of light to be emitted from another distance measurement device in the system, and transmitting the first setting data to the other distance measurement device; and controlling light emission from the light emission device in accordance with second setting data for defining an irradiation range of light to be emitted from the light emission device, when having received the second setting data from the other distance measurement device.

14. A non-transitory computer-readable recording medium storing a computer program executed by a computer of a distance measurement device in a system including two or more distance measurement devices having distance measurement ranges that are adjacent to each other or partially overlap each other, the computer program causing the computer to execute:

causing a light emission device to emit light, the light emission device being configured to change an irradiation range of the light;

causing a light reception device to detect reflected light generated from the light emitted from the light emission device when reflected at a target object and to output a detection signal;

determining the position of the target object by calculating the distance to the target object based on the detection signal;

generating, based on the determined position of the target object, first setting data for defining an irradiation range of light to be emitted from another distance measurement device in the system, and transmitting the first setting data to the other distance measurement device; and controlling light emission from the light emission device in accordance with second setting data for defining an irradiation range of light to be emitted from the light emission device, when having received the second setting data from the other distance measurement device.

\* \* \* \* \*